US010282661B2

(12) United States Patent
Modha

(10) Patent No.: US 10,282,661 B2
(45) Date of Patent: May 7, 2019

(54) MULTI-MODAL NEURAL NETWORK FOR UNIVERSAL, ONLINE LEARNING

(71) Applicant: International Business Machines Corporation, Armonk, NY (US)

(72) Inventor: Dharmendra S. Modha, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/456,429

(22) Filed: Mar. 10, 2017

(65) Prior Publication Data
US 2017/0185896 A1 Jun. 29, 2017

Related U.S. Application Data

(63) Continuation of application No. 13/596,274, filed on Aug. 28, 2012, now Pat. No. 9,639,802, which is a (Continued)

(51) Int. Cl.
*G06N 3/02* (2006.01)
*G06N 3/08* (2006.01)
*G06N 3/04* (2006.01)

(52) U.S. Cl.
CPC .............. *G06N 3/08* (2013.01); *G06N 3/04* (2013.01); *G06N 3/02* (2013.01)

(58) Field of Classification Search
None
See application file for complete search history.

(56) References Cited

U.S. PATENT DOCUMENTS 4,893,255 A  1/1990 Tomlinson, Jr.
5,331,550 A  7/1994 Stafford et al.
(Continued)

FOREIGN PATENT DOCUMENTS

WO  2008112921 A1  9/2008
WO  2009006735 A1  1/2009

OTHER PUBLICATIONS

Tsague, Machine Condition Monitoring Using Neural Networks: Feature Selection Using Genetic Algorithm, Master's Thesis, University of the Witwatersrand, Apr. 2006, pp. 1-57 (Year: 2006).*
(Continued)

*Primary Examiner* — Wilbert L Starks
(74) *Attorney, Agent, or Firm* — Sherman IP LLP; Kenneth L. Sherman; Hemavathy Perumal

(57) ABSTRACT

In one embodiment, the present invention provides a neural network comprising multiple modalities. Each modality comprises multiple neurons. The neural network further comprises an interconnection lattice for cross-associating signaling between the neurons in different modalities. The interconnection lattice includes a plurality of perception neuron populations along a number of bottom-up signaling pathways, and a plurality of action neuron populations along a number of top-down signaling pathways. Each perception neuron along a bottom-up signaling pathway has a corresponding action neuron along a reciprocal top-down signaling pathway. An input neuron population configured to receive sensory input drives perception neurons along a number of bottom-up signaling pathways. A first set of perception neurons along bottom-up signaling pathways drive a first set of action neurons along top-down signaling pathways. Action neurons along a number of top-down signaling pathways drive an output neuron population configured to generate motor output.

20 Claims, 25 Drawing Sheets

Related U.S. Application Data continuation of application No. 13/325,321, filed on Dec. 14, 2011, now Pat. No. 8,626,684.

(56) References Cited

U.S. PATENT DOCUMENTS

| | | | |
|---|---|---|---|
| 5,469,530 | A | 11/1995 | Makram-Ebeid |
| 5,619,619 | A | 4/1997 | Shinohara |
| 5,646,868 | A | 7/1997 | Ueda et al. |
| 5,721,807 | A | 2/1998 | Tschirk |
| 5,764,860 | A | 6/1998 | Yatsuzuka |
| 5,768,476 | A | 6/1998 | Sugaya et al. |
| 6,134,537 | A | 10/2000 | Pao et al. |
| 7,181,768 | B1 | 2/2007 | Ghosh et al. |
| 7,412,428 | B2 | 8/2008 | Nugent |
| 7,430,546 | B1 | 9/2008 | Suri |
| 7,543,266 | B2 | 6/2009 | Brown |
| 7,676,441 | B2 | 3/2010 | Matsugu |
| 7,953,683 | B2 | 5/2011 | Minamino et al. |
| 7,996,342 | B2 | 8/2011 | Grabarnik et al. |
| 8,059,890 | B2 | 11/2011 | Bach |
| 8,103,602 | B2 | 1/2012 | Izhikevich |
| 8,285,667 | B2 | 10/2012 | Jaros et al. |
| 8,856,055 | B2 | 10/2014 | Brezzo |
| 2008/0071712 | A1 | 3/2008 | Cecchi et al. |
| 2008/0091628 | A1 | 4/2008 | Srinivasa et al. |
| 2010/0179935 | A1 | 7/2010 | Srinivasa et al. |
| 2012/0311595 | A1 | 12/2012 | Saha et al. |
| 2013/0073493 | A1 | 3/2013 | Modha et al. |
| 2013/0073494 | A1 | 3/2013 | Modha et al. |
| 2014/0019393 | A1 | 1/2014 | Modha et al. |
| 2014/0250039 | A1 | 9/2014 | Modha et al. |
| 2015/0227849 | A1 | 8/2015 | Jaros |
| 2015/0262056 | A1 | 9/2015 | Modha et al. |
| 2015/0363690 | A1 | 12/2015 | Modha et al. |
| 2015/0371131 | A1 | 12/2015 | Modha et al. |
| 2016/0162780 | A1 | 6/2016 | Moda |
| 2017/0017378 | A1 | 1/2017 | Moda |
| 2017/0213133 | A1 | 7/2017 | Modha |
| 2017/0308788 | A1 | 10/2017 | Modha |
| 2018/0268294 | A1 | 9/2018 | Modha |

OTHER PUBLICATIONS

Swinehart, C.D. et al, "Dimensional Reduction for Reward-based Learning", Network: Computation in Neural Systems, Sep. 2006, pp. 235-252, vol. 17, Issue 3, Informa Healthcare, United Kingdom.

Schaal, S. et al., "Computational Approaches to Motor Learning by Imitation," Philosophical Transactions of the Royal Society B: Biological Sciences, Mar. 29, 2003, pp. 537-547, vol. 353, No. 1431, The Royal Society, London, United Kingdom.

Upegui, A. et al., "An FPGA Platform for On-line Topology Exploration of Spiking Neural Networks", Microprocessors and Microsystems, 2005, pp, 211-223, vol. 29, No. 5, Elsevier B.V., The Netherlands.

Seeger, M.W. et al., "Bayesian Inference and Optimal Design for the Sparse Linear Model," Journal of Machine Learning Research (JMLR), Apr. 2008, pp. 759-813, vol. 9, Massachusetts Institute of Technology Press and Microtome Publishing, United States.

Huerta, R. et al., "Fast and Robust Learning by Reinforcement Signals: Explorations in the insect Brain," Letter in Neural Computation, Aug. 2009, pp. 2123-2151, vol. 21, No. 8, Massachusetts Institute of Technology Press, United States.

Buonomano, D.V. et al., "State-Dependent Computations: Spatiotemporal Processing in Cortical Networks," Nature Reviews Neuroscience, 2009, pp. 113-125, vol. 10, No. 2, Macmillan Publishers Limited, United States.

Cios, K.J. et al., "Advances in Applications of Spiking Neuron Networks", Proceedings of the SPIE Applications and Science of Computational Intelligence III Conference, 2000, pp. 324-336, vol. 4055, SPIE, United States.

Hahnloser, R., "Learning Algorithms Based on Linearization," Network: Computation in Neural System, Aug. 1998, pp. 363-380, vol. 9, No. 3, Inform Healthcare, United Kingdom.

Pham, H.T. et al., "Controlling Multi-Class Error Rates for MLP Classifier by Bias Adjustment based on Penalty Matrix", Proceedings of the 6th International Conference on Ubiquitous Information Management and Communication (ICUIMC'12), Feb. 20-22, 2012, pp. 1-9, ACM, United States.

Ijspeert, A.J.,"Central pattern generators for locomotion control in animals and robot: A review", Neural Networks 21, Mar. 7, 2008, pp. 642-653, Elsevier, Untied States.

Righetti, L. et al., "Dynamic Hebbian learning in adaptive frequency oscillators", Scienedirect Physica D 216, 2006, pp. 269-281, Elsevier, United States.

Anonyomous, Basic Conceptions for Neural Networks (BCNN), "Basic concepts for neural networks", Neural Network Technology, pp. 1-6, Cheshire Engineering Corporation, downloaded Dec. 22, 2013 from http://www.cheshireeng,com/Neuralyst/nnbg.htm.

Bengio, S. et al., "On the Optimization of a Synaptic Learning Rule", Proceedings of the 1992 Conference on Optimality in Artificial and Biological Neural Networks, 1992, pp. 1-29, United States.

Koenderink, J.J., "Simultaneous Order in Nervous Nets from a Functional Standpoint", Biological Cybernetics, 1984, pp. 35-41, Vo. 50, Spring-Verlag, United States.

Petridis, V. et al., "Fuzzy Lattice Neural Network (FLNN): A Hybrid Model for Learning", IEEE Transactions on Neural Networks, Sep. 1998, pp. 877-890, vol. 9, No. 5, United States.

Bullmore, E. et al., "Complex brain networks: graph theoretical analysis of structural and functional systems", Mar. 2009, Naure Reviews: Neuroscience, pp. 186-198, vol. 10, United States.

Martinetz, T. et al., "Three-Dimensional Neural Net for Learning Visuornotor Coordination of a Robot Arm", IEEE Transactions on Neural Networks, Mar. 1990, pp. 131-136, vol. 1, No. 1, United States.

Schuster, M. et al., "Bidirectional Recurrent Neural Networks", Proceedings of the 1997 IEEE Transactions on Signal Processing, Nov. 1997, pp. 2673-2681, vol. 45, No, 11, IEEE Transactions, United States.

Anonyomous, "4.2 Spike response model (SRM)", 2002, pp. 1-16, Cambridge University Press, United States [downloaded from http://icwww.epfl.chi~gerstner/SPNM/node27.html on Jul. 31, 2015].

Collobert, R. et al., "A Unified Architecture for Natural Language Processing: Deep Neural Networks with Multitask Learning", Proceedings of the 25th International Conference on Machine Learning, 2008, pp. 1-8, Finland.

Hesse, F. et al., "Modulated Exploratory Dynamics Can Shape Self-Organized Behavior", Advances in Complex Systems, 2009, pp. 1-18, vol. 12, No. 3, World Scientific Publishing Company, United States.

U.S. Non-Final Office Action for U.S. Appl. No. 13/235,342 dated Dec. 26, 2013.

U.S. Final Office Action for U.S. Appl. No. 13/235,342 dated Apr. 18, 2014.

U.S. Notice of Allowance for U.S. Appl. No. 13/235,342 dated Jun. 23, 2014.

U.S. Non-Final Office Action for U.S. Appl. No. 13/587,424 dated Aug. 10, 2015.

U.S. Notice of Allowance for U.S. Appl. No. 13/587,424 dated Sep. 16, 2015.

U.S. Non-Final Office Action for U.S. Appl. No. 14/494,372 dated Dec. 10, 2015.

U.S. Notice of Allowance for U.S. Appl. No. 14/494,372 dated Mar. 29, 2016.

U.S. Non-Final Office Action for U.S. Appl. No. 14/945,316 dated Jan. 20, 2017.

U.S. Non-Final Office Action for U.S. Appl. No. 13/325,316 dated Dec. 16, 2013.

U.S. Notice of Allowance for U.S. Appl. No. 13/325,316 dated Mar. 28, 2014.

U.S. Non-Final Office Action for U.S. Appl. No. 13/594,045 dated Mar. 24, 2015.

(56) References Cited

OTHER PUBLICATIONS

U.S. Notice of Allowance for U.S. Appl. No. 13/594,045 dated Mar. 1, 2017.
U.S. Notice of Allowance for U.S. Appl. No. 13/235,343 dated Jan. 13, 2013.
U.S. Non-Final Office Action for U.S. Appl. No. 13/594,058 dated Aug. 20, 2015.
U.S. Notice of Allowance for U.S. Appl. No. 13/594,058 dated Nov. 12, 2015.
U.S. Non-Final Office Action for U.S. Appl. No. 15/015,990 dated Apr. 12, 2016.
U.S. Notice of Allowance for U.S. Appl. No. 15/015,990 dated Jul. 6, 2016.
U.S. Notice of Allowance for U.S. Appl. No. 13/325,321 dated Aug. 29, 2013.
U.S. Non-Final Office Action for U.S. Appl. No. 13/596,274 dated May 11, 2015.
U.S. Final Office Action for U.S. Appl. No. 13/596,274 dated Sep. 8, 2015.
U.S. Advisory Action for U.S. Appl. No. 131596,274 dated Dec. 11, 2015.
U.S. Non-Final Office Action for U.S. Appl. No. 13/596,274 dated Feb. 18, 2016.
U.S. Final Office Action for U.S. Appl. No. 13/596,274 dated Jul. 14, 2016.
U.S. Advisory Action for U.S. Appl. No. 13/596,274 dated Oct. 21, 2016.
U.S. Notice of Allowance for U.S. Appl. No. 13/596,274 dated Dec. 16, 2016.
U.S. Final Office Action for U.S. Appl. No. 14/945,316 dated May 18, 2017.
U.S. Advisory Action for U.S. Appl. No. 14/945,316 dated Jul. 18, 2017.
U.S. Non-Office Action for U.S. Appl. No. 14/945,316 dated Nov. 20, 2017.
U.S. Notice of Allowance for U.S. Appl. No. 14/945,316 dated Mar. 12, 2018.
U.S. Non-Office Action for U.S. Appl. No. 15/162,361 dated Feb. 4, 2019.

* cited by examiner

100

$\{S_1, S_2, S_3\}$ $\{S_1, S_2\}$ $\{S_1, S_3\}$ $\{S_2, S_3\}$ $\{S_1\}$ $\{S_2\}$ $\{S_3\}$

MULTI-MODAL NEURAL NETWORK FOR UNIVERSAL, ONLINE LEARNING

GOVERNMENT RIGHTS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, a multi-modal neural network for universal, online learning.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

SUMMARY

In one embodiment, the present invention provides a neural network comprising multiple modalities. Each modality comprises multiple neurons. The neural network further comprises an interconnection lattice for cross-associating signaling between the neurons in different modalities. Each neuron generates a signal in response to input signals from one or more other neurons via the interconnection lattice. The interconnection lattice comprises a plurality of reciprocal signaling pathways for directed information flow between different modalities. The plurality of reciprocal signaling pathways comprises top-down signaling pathways and bottom-up signaling pathways configured for information flow in a first direction and a second direction opposite to the first direction, respectively. Each bottom-up signaling pathway has a reciprocal top-down signaling pathway, such that bottom-up signaling pathways for a first set of modalities influence top-down signaling pathways for a second set of modalities via learning rules.

In another embodiment, the present invention provides a neural network comprising a first set and a second set of neural nodes. Each node of the first set comprises multiple neuron populations including multiple neurons. Each node of the second set is a union of at least two nodes of the first set. The neural network further comprises an interconnect network comprising multiple directed edges that connect neuron in nodes of the first set with neurons in nodes of the second set. Nodes of the first and second set are arranged in a lattice. A connected node of the second set exchanges signals with at least two nodes of the first set via the interconnect network. Each neuron generates a firing signal in response to input signals from one or more other neurons via the interconnect network.

In yet another embodiment, the present invention provides a method comprising interconnecting a plurality of neural nodes via an interconnect network of multiple signaling pathways arranged in a lattice. Interconnecting said plurality of neural nodes includes connecting a plurality of first nodes in a first set of nodes with a plurality of second nodes in a second set of nodes. Each node generates a signal in response to input signals received from one or more other nodes via the interconnect network. A connected node in the second set exchanging signals with at least two nodes in the first set via the interconnect network.

In yet another embodiment, the present invention provides a computer program product on a computer-readable medium for cross-associating signaling in a neural network comprising a plurality of neural nodes connected via an interconnect network. The interconnect network comprises bottom-up signaling pathways and top-down signaling pathways arranged in a lattice. Each node has a sensory-motor modality and generates a signal in response to input signals received from one or more other nodes via the interconnect network.

These and other features, aspects and advantages of the present invention will become understood with reference to the following description, appended claims and accompanying figures.

DETAILED DESCRIPTION

Figure 1:
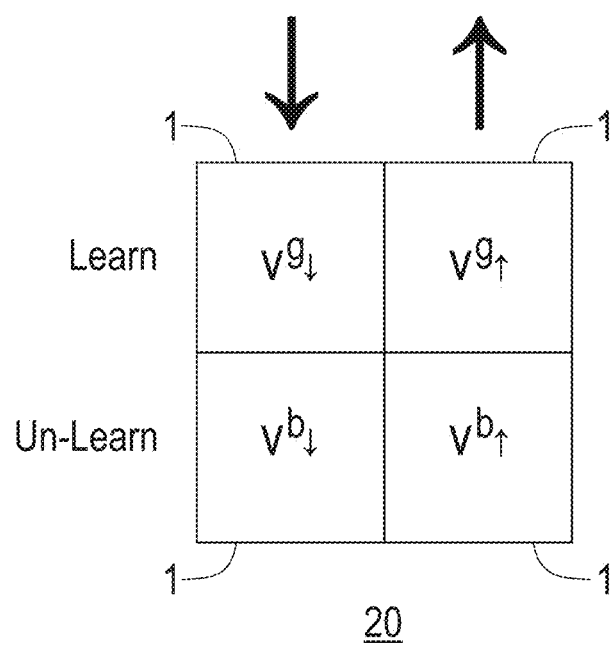
FIG. 1 illustrates an example structure of a neural module, in accordance with an embodiment of the invention.

The present invention relates to a multi-modal neural network for universal, online learning. In one embodiment, the present invention provides a neural network comprising multiple modalities, wherein each modality comprises multiple neurons. The neural network further comprises an interconnection lattice for cross-associating signaling between the neurons in the different modalities. Each neuron generates a signal in response to input signals from one or more other neurons via the interconnection lattice.

The interconnection lattice comprises a plurality of reciprocal signaling pathways for directed information flow between different modalities. The plurality of reciprocal signaling pathways comprises top-down signaling pathways and bottom-up signaling pathways configured for information flow in a first direction and a second direction opposite to the first direction, respectively.

Each bottom-up signaling pathway has a reciprocal top-down signaling pathway, such that bottom-up signaling pathways for a first set of modalities influence top-down signaling pathways for a second set of modalities via learning rules. The bottom-up signaling pathways are arranged in an acyclic bottom-up digraph. The top-down signaling pathways are arranged in an acyclic top-down digraph, such that each top-down signaling pathway in the top-down digraph has a reciprocal bottom-up signaling pathway in the bottom-up digraph, and each action neuron population along a top-down signaling pathway in the top-down digraph corresponds to a perception neuron population along a reciprocal bottom-down pathway in the bottom-up digraph.

Each modality further includes a perception neuron population and an action neuron population, such that each perception neuron has a corresponding action neuron. A perception neuron population at an input periphery of the neural network is designated as an input neuron population configured to receive sensory input, and an action neuron population at an output periphery of the neural network is designated as an output neuron population configured to generate motor output.

The interconnection lattice further includes a plurality of perception neuron populations along a number of bottom-up signaling pathways, and a plurality of action neuron populations along a number of top-down signaling pathways. The input neuron population drives perception neurons along a number of bottom-up signaling pathways. A first set of perception neurons along bottom-up signaling pathways drive a first set of action neurons along top-down signaling pathways. Action neurons along a number of top-down signaling pathways drive the output neuron population.

Each perception neuron along a bottom-up signaling pathway is trained using a learning rule based on the firing events of said perception neuron and the firing events of the corresponding action neuron along a reciprocal top-down signaling pathway. Each action neuron along a top-down signaling pathway is trained using a learning rule based on the firing events of said action neuron and the firing events of the corresponding perception neuron along a reciprocal bottom-up signaling pathway.

In another embodiment, the present invention provides a neural network comprising a first set and a second set of neural nodes. Each node of the first set comprises multiple neuron populations including multiple neurons. Each node of the second set is a union of at least two nodes of the first set. The neural network further comprises an interconnect network comprising multiple directed edges that connect neuron in nodes of the first set with neurons in nodes of the second set. Nodes of the first and second set are arranged in a lattice. A connected node of the second set exchanges signals with at least two nodes of the first set via the interconnect network. Each neuron generates a firing signal in response to input signals from one or more other neurons via the interconnect network.

Neuron populations in a node are interconnected via multiple directed edges arranged in an acyclic digraph, each edge comprising a signaling pathway in the interconnect network. The interconnect network interconnects said nodes via bottom-up signaling pathways arranged in an acyclic bottom-up digraph in the interconnect network, each bottom-up signaling pathway including one or more neuron populations and directed edges. A first neuron population in a first node is interconnected to a second neuron population in a second node only if the second node is a superset of the first node. The interconnect network further interconnects said nodes via top-down signaling pathways arranged in an acyclic top-down digraph in the interconnect network, each top-down signaling pathway including one or more neuron populations and directed edges.

Each neuron population in the top-down digraph corresponds to a neuron population in the bottom-up digraph. Each top-down signaling pathway in the top-down digraph has a reciprocal bottom-up signaling pathway in the bottom-up digraph, wherein information flows along said top-down signaling pathway in a first direction, and information flows along said reciprocal bottom-up signaling pathway in a direction opposite of the first direction.

A neuron population at an input periphery of the neural network is designated as an input neuron population configured to receive sensory input, wherein the input neuron population drives neurons along a number of bottom-up signaling pathways. A first set of neurons along bottom-up signaling pathways drive a first set of neurons along top-down signaling pathways. A neuron population at an output periphery of the neural network is designated as an output neuron population configured to generate motor output, wherein neurons along a number of top-down signaling pathways drive the output neuron population.

Each neuron along a bottom-up signaling pathway is trained using a learning rule based on the firing events of said neuron and the firing events of the corresponding neuron along a reciprocal top-down signaling pathway. Each neuron along a top-down signaling pathway is trained using a learning rule based on the firing events of said neuron and the firing events of the corresponding neuron along a reciprocal bottom-up signaling pathway.

In yet another embodiment, the present invention provides a method comprising interconnecting a plurality of neural nodes via an interconnect network of multiple signaling pathways arranged in a lattice. Interconnecting said plurality of neural nodes includes connecting a plurality of first nodes in a first set of nodes with a plurality of second nodes in a second set of nodes. Each node generates a signal in response to input signals received from one or more other nodes via the interconnect network. A connected node in the second set exchanging signals with at least two nodes in the first set via the interconnect network.

A node comprises one or more neuron populations interconnected via multiple directed edges arranged in an acyclic digraph, wherein each neuron population comprises one or more neurons, and each edge includes a signaling pathway in the interconnect network. Interconnecting said plurality of neural nodes further includes interconnecting said plurality of neural nodes via bottom-up signaling pathways arranged in an acyclic bottom-up digraph in the interconnect network, each bottom-up signaling pathway including one or more neuron populations and directed edges. Interconnecting said plurality of neural nodes further includes interconnecting said plurality of neural nodes via top-down signaling pathways arranged in an acyclic top-down digraph in the interconnect network, each top-down signaling pathway including one or more neuron populations and directed edges.

In yet another embodiment, the present invention provides a computer program product on a computer-readable medium for cross-associating signaling in a neural network comprising a plurality of neural nodes connected via an interconnect network. The interconnect network comprises bottom-up signaling pathways and top-down signaling pathways arranged in a lattice. Each node has a sensory-motor modality and generates a signal in response to input signals received from one or more other nodes via the interconnect network.

Embodiments of the present invention provide a computational architecture representing a number of sensory and motor ("sensory-motor") modalities of a neural network, wherein each modality comprises an input and an output neuron population such that each input neuron corresponds to exactly one output neuron. The input population of each modality drives perception neurons along a number of bottom-up pathways and the output population is driven by action neurons along a number of top-down pathways, where each bottom-up pathway has a reciprocal top-down pathway and each perception neuron has a corresponding action neuron. Bottom-up pathways from several modalities can interact along an underlying lattice and can influence top-down pathways of other modalities. Each perception neuron is trained via the output of the corresponding action neuron in the reciprocal top-down pathway, and, conversely, each action neuron is trained via the output of the corresponding perception neuron. The entire system maintains stable activity levels via self-tuning and gain control. The resulting computational architecture is online, local, parallel, distributed, can deal with massive influx of data, can be adapted to work with spiking neurons, can extract deep features, and can solve problems of unsupervised learning, supervised learning, and reinforcement learning within a single universal substrate of adaptation.

The term digital neuron as used herein represents an architecture configured to simulate a biological neuron. A digital neuron creates connections between processing elements that are roughly functionally equivalent to neurons of a biological brain. As such, a neuromorphic and synaptronic computation comprising digital neurons according to embodiments of the invention may include various electronic circuits that are modeled on biological neurons. Further, a neuromorphic and synaptronic computation comprising digital neurons according to embodiments of the invention may include various processing elements (including computer simulations) that are modeled on biological neurons. Although certain illustrative embodiments of the invention are described herein using digital neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

An external two-way communication environment may supply sensory inputs and consume motor outputs. Digital neurons implemented using complementary metaloxide-semiconductor (CMOS) logic gates receive spike inputs and integrate them. The neurons include comparator circuits that generate spikes when the integrated input exceeds a threshold. In one embodiment, weighted synaptic connections are implemented using transposable 1-bit static random-access memory (SRAM) cells, wherein each neuron can be an excitatory or inhibitory neuron. Each learning rule on each neuron axon and dendrite are reconfigurable.

FIG. 1 illustrates an example structure of a neural module 20, in accordance with an embodiment of the invention. Each neural module 20 comprises multiple neurons 1. For instance, the neural module 20 comprises four neurons, neurons $v^g\uparrow$, $v^g\downarrow$, $v^b\uparrow$, and $v^b\downarrow$. Each neuron 1 of a neural module 20 is classified as one of the following four types of neurons: a perception neuron in a learning, bottom-up pathway; an action neuron in a learning, top-down pathway; a perception neuron in an unlearning, bottom-up pathway; and, an action neuron in an unlearning, top-down pathway. In this specification, a neuron in a learning pathway is generally referred to as a good neuron. A neuron in an unlearning pathway is generally referred to as a bad neuron.

In FIG. 1, the neuron $v^g\uparrow$ is a good perception neuron in a learning, bottom-up pathway, the neuron $v^g\downarrow$ is a good action neuron in a learning, top-down pathway, the neuron $v^b\uparrow$ is a bad perception neuron in an unlearning, bottom-up pathway, and the neuron $v^b\downarrow$, is a bad neuron in an unlearning, top-down pathway.

Figure 2:
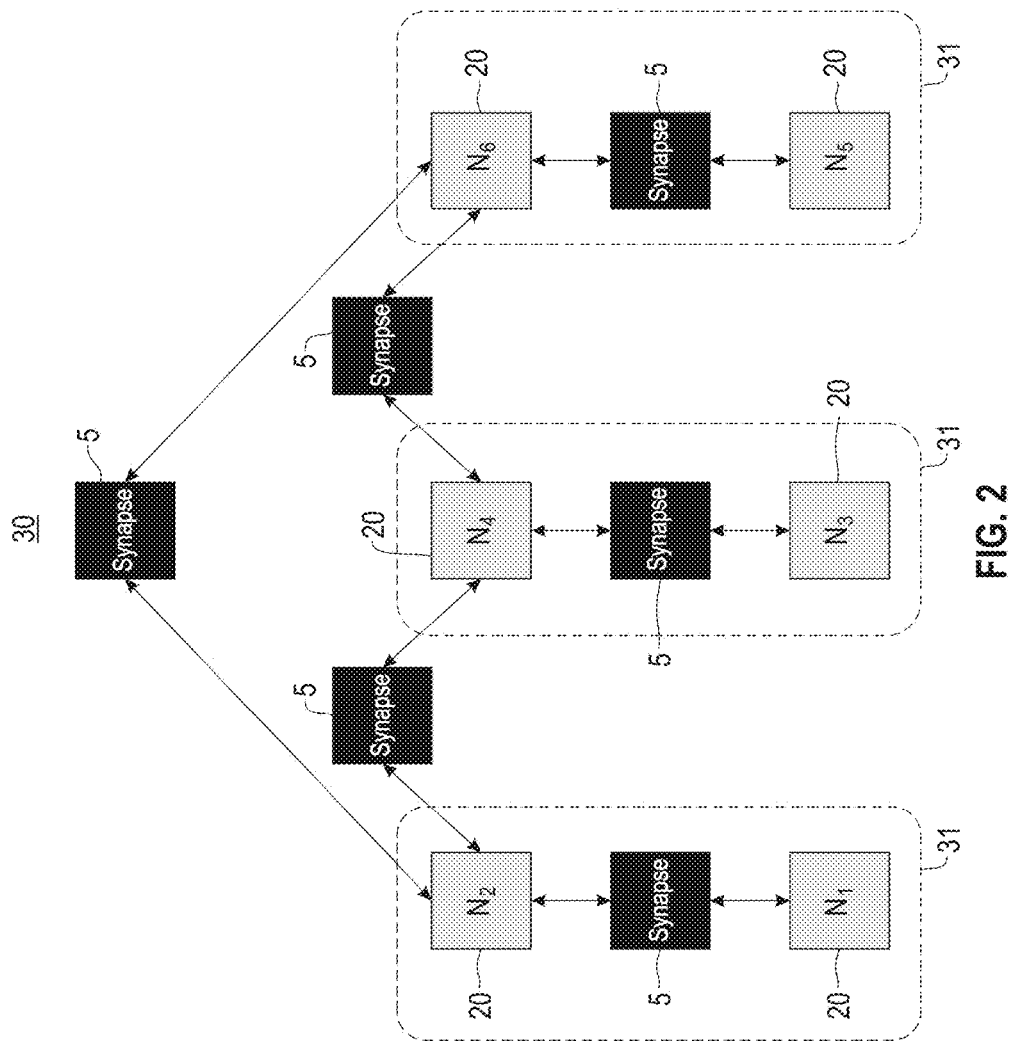
FIG. 2 illustrates a neural network circuit, in accordance with an embodiment of the invention.

FIG. 2 illustrates a neural network circuit 30, in accordance with an embodiment of the invention. The neural network circuit 30 comprises a plurality of neural modules 20, such as neural modules N1, N2, N3, N4, N5, and N6. Each neural module 20 comprises multiple neurons 1 (FIG. 1). The neural network circuit 30 further comprises a plurality of synapses (i.e., synaptic connections) 5 interconnecting the neural modules 20. Each synapse 5 interconnects a first neural module 20 to a second neural module 20, thereby allowing bi-directional information flow between the neurons 1 in the first neural module 20 and the neurons 1 in the second neural module 20.

The neural network circuit 30 may be used to implement a neural network circuit combining multiple sensory and motor modalities into one computational architecture. Sensory and motor modalities represent biological sensors and actuators (e.g., eyes, ears, hands), as well as non-biological sensors and actuators (e.g., thermal sensors).

For instance, the neural modules 20 of the neural network circuit 30 may be organized into multiple neural module sets 31, such as a first neural module set 31 comprising the neural modules N1 and N2, a second neural module set 31 comprising the neural modules N3 and N4, and a third neural module set 31 comprising the neural modules N5 and N6. Each neural module set 31 represents a different sensory or motor modality (e.g., vision, auditory, etc.).

Each neural module set 31 may cross-associate with other neural module sets 31. Specifically, a neural module 20 in one neural module set 31 may be interconnected to another neural module 20 in another neural module set 31. For instance, a synapse 5 interconnects the neural module N2 in the first neural module set 31 to the neural module N4 in the second neural module set 31. Another synapse 5 interconnects the neural module N2 in the first neural module set 31 to the neural module N6 in the third neural module set 31. As such, the first neural module set 31 cross-associates with both the second and third neural module sets 31.

A neural network may be represented as an acyclic directed graph ("digraph") comprising a set of vertices (i.e., nodes) and a set of directed edges. Each directed edge interconnects a sending vertex to a receiving vertex. In this specification, let G'=(V', E') generally denote an acyclic digraph comprising a set of vertices V' and a set of directed edges E'. Let sink(G') denote a subset of vertices in V' that have no outgoing directed edges (i.e., do not send out outgoing connections). Let source(G') denote a subset of vertices in V' that have no incoming directed edges (i.e., do not receive incoming connections).

Neural modules from several sensory and motor modalities can interact along an underlying interconnection lattice. Let L generally denote an interconnection lattice that cross-associates multiple sensory and motor modalities. Let $S_1, S_2, \ldots, S_m$ generally denote the sensory and motor modalities, where m is the total number of sensory or motor modalities that the lattice L cross-associates. Let S generally denote a modality of the lattice L.

Further, let S' generally denote a set. For any set S', let |S'| denote its cardinality. L comprises non-empty subsets of $F \equiv \{S_1, S_2, \ldots, S_m\}$. Sets $\{S_1\}, \{S_2\}, \ldots, \{S_m\}$ denote atomic sets of the modalities $S_1, S_2, \ldots, S_m$, respectively. Let $A = \{\{S_1\}, \{S_2\}, \ldots, \{S_m\}\}$, where A denotes the set of all atomic sets.

FIGS. 3-6 illustrate the stages of setting up an example interconnection lattice 100, in accordance with an embodiment of the invention.

Figure 3:
FIG. 3 illustrates nodes arranged in an interconnection lattice, in accordance with an embodiment of the invention.
Figure 3:
Figure 3:
Figure 3:
Figure 3:
Figure 3:
Figure 3:

FIG. 3 illustrates nodes arranged in an interconnection lattice 100, in accordance with an embodiment of the invention. The lattice 100 cross-associates multiple sensory and motor modalities, such as modalities $S_1$, $S_2$, and $S_3$. The lattice 100 comprises a first set of nodes comprising multiple nodes 2, and a second set of nodes comprising multiple nodes 3. Each node 2 represents an atomic set that has a sensory or motor modality. Specifically, a first node 2 represents an atomic set $\{S_1\}$ having the modality $S_1$, a second node 2 represents an atomic set $\{S_2\}$ having the modality $S_2$, and a third node 2 represents an atomic set $\{S_3\}$ having the modality $S_3$.

Each node 3 represents a union of two or more nodes 2 (i.e., two or more atomic sets). Specifically, a first node 3 represents a superset $\{S_1, S_2\}$ that is the union of atomic sets $\{S_1\}$ and $\{S_2\}$. A second node 3 represents a superset $\{S_1, S_3\}$ that is the union of atomic sets $\{S_1\}$ and $\{S_3\}$. A third node 3 represents a superset $\{S_2, S_3\}$ that is the union of atomic sets $\{S_2\}$ and $\{S_3\}$. Finally, a fourth node 3 represents a superset $\{S_1, S_2, S_3\}$ that is the union of atomic sets $\{S_1\}, \{S_2\}$, and $\{S_3\}$.

Each modality S of the lattice L may be represented by an acyclic digraph $G^S$. Let acyclic digraph $G^S = (V^S, E^S)$, where $V^S$ denotes the set of vertices in $G^S$, and $E^S$ denotes the set of directed edges in $G^S$. Let sink($G^S$) denote a subset of vertices in $V^S$ that have no outgoing edges (i.e., outgoing connections). Let source($G^S$) denote a subset of vertices in $V^S$ that have no incoming edges (i.e., incoming connections).

If $S \in A$ (i.e., set $\{S\}$ is an atomic set), digraph $G^S$ is non-empty and |source($G^S$)|=1. One of the vertices in $V^S$ must be a source, and only one of the vertices in $V^S$ can be a source. If $S \notin A$ (i.e., set $\{S\}$ is not an atomic set), digraph $G^S$ may be empty.

Figure 4:
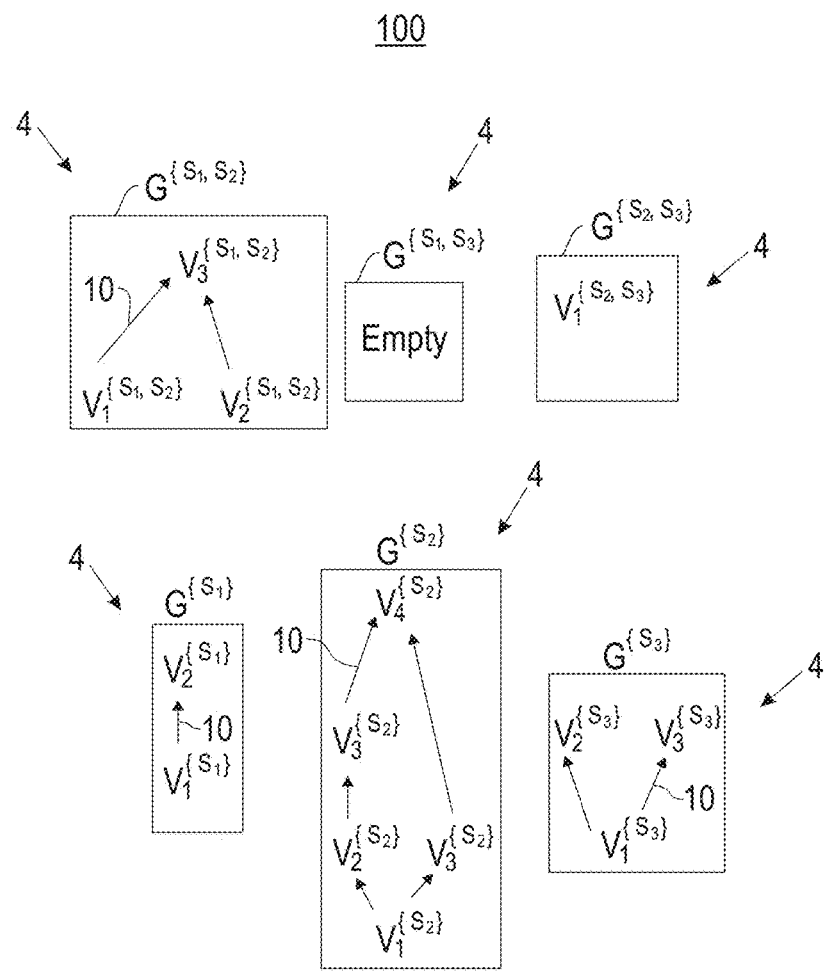
FIG. 4 illustrates acyclic digraphs for each node in a lattice, in accordance with an embodiment of the invention.

FIG. 4 illustrates acyclic digraphs 4 for each node 2, 3 in the lattice 100, in accordance with an embodiment of the invention. Each node 2, 3 comprises multiple vertices interconnected via multiple directed edges 10. The vertices and edges 10 of each node 2, 3 are arranged in an acyclic digraph 4.

Specifically, the first node 2 representing the atomic set $\{S_1\}$ (FIG. 3) provides an acyclic digraph $G^{\{S_1\}}$ in FIG. 4. The digraph $G^{\{S_1\}}$ is non-empty, comprising vertices $V_1^{\{S_1\}}$ and $V_2^{\{S_1\}}$. The digraph $G^{\{S_1\}}$ further comprises a directed edge 10 interconnecting the vertex $V_1^{\{S_1\}}$ to the vertex $V_2^{\{S_1\}}$. The vertex $V_1^{\{S_1\}}$ in the digraph $G^{\{S_1\}}$ is a source vertex.

The second node 2 representing the atomic set $\{S_2\}$ (FIG. 3) provides an acyclic digraph $G^{\{S_2\}}$ in FIG. 4. The digraph $G^{\{S_2\}}$ is non-empty, comprising vertices $V_1^{\{S_2\}}, V_2^{\{S_2\}}, V_3^{\{S_2\}}$, and $V_4^{\{S_2\}}$. The digraph $G^{\{S_2\}}$ further comprises multiple directed edges 10 interconnecting the vertices in the digraph $G^{\{S_2\}}$. Specifically, the vertex $V_1^{\{S_2\}}$ is interconnected to the vertex $V_2^{\{S_2\}}$, the vertex $V_1^{\{S_2\}}$ is interconnected to the vertex $V_3^{\{S_2\}}$, the vertex $V_2^{\{S_2\}}$ is interconnected to the vertex $V_3^{\{S_2\}}$, and the vertex $V_3^{\{S_2\}}$ is interconnected to the vertex $V_4^{\{S_2\}}$. The vertex $V_1^{\{S_2\}}$ in the digraph $G^{\{\}}$ is a source vertex.

The third node 2 representing the atomic set $\{S_3\}$ (FIG. 3) provides an acyclic digraph $G^{\{S_3\}}$ in FIG. 4. The digraph $G^{\{S_3\}}$ is non-empty, comprising vertices $V_1^{\{S_3\}}, V_2^{\{S_3\}}$, and $V_3^{\{S_3\}}$. The digraph $G^{\{S_3\}}$ further comprises multiple directed edges 10 interconnecting the vertices in the digraph $G^{\{S_3\}}$. Specifically, the vertex $V_1^{\{S_3\}}$ is interconnected to the vertex $V_2^{\{S_3\}}$, and the vertex $V_1^{\{S_3\}}$ is interconnected to the vertex $V_3^{\{S_3\}}$. The vertex $V_1^{\{S_3\}}$ in the digraph $G^{\{S_3\}}$ is a source vertex.

The first node 3 representing the atomic set $\{S_1, S_2\}$ (FIG. 3) provides an acyclic digraph $G^{\{S_1, S_2\}}$ in FIG. 4. The digraph $G^{\{S_1,S_2\}}$ is a non-empty, comprising vertices $V_1^{\{S_1,S_2\}}$, $V_2^{\{S_1,S_2\}}$, and $V_3^{\{S_1,S_2\}}$. The digraph $G^{\{S_1,S_2\}}$ further comprises multiple directed edges 10 interconnecting the vertices in the digraph $G^{\{S_1,S_2\}}$. Specifically, the vertex $V_1^{\{S_1,S_2\}}$ is interconnected to the vertex $V_3^{\{S_1,S_2\}}$, and the vertex $V_2^{\{S_1,S_2\}}$ is interconnected to the vertex $V_3^{\{S_1,S_2\}}$.

The second node 3 representing the atomic set $\{S_1, S_3\}$ (FIG. 3) provides an acyclic digraph in $G^{\{S_1,S_3\}}$ in FIG. 4. The digraph $G^{\{S_1,S_3\}}$ is empty.

The third node 3 representing the atomic set $\{S_2, S_3\}$ (FIG. 3) provides an acyclic digraph $G^{\{S_2,S_3\}}$ in FIG. 4. The digraph $G^{\{S_1,S_3\}}$ is a non-empty, comprising only the vertex $V_1^{\{S_2,S_3\}}$.

Each digraph $G^S$ may be arranged in an acyclic bottom-up digraph, wherein the bottom-up digraph comprises the vertices and edges of each digraph $G^S$. Let $G^\uparrow$ generally denote a bottom-up digraph. $G^\uparrow=(V^\uparrow, E^\uparrow)$, where $V^\uparrow$ comprises all vertices $\cup_{S\in L} V^S$, and $E^\uparrow$ comprises all edges $\cup_{S\in L} E^S$. Source vertices in $G^\uparrow$ comprise only the source vertices in the acyclic digraphs corresponding to the atomic sets, that is source($G^\uparrow$)=$\cup_{S\in A}$source($G^S$).

Figure 5:
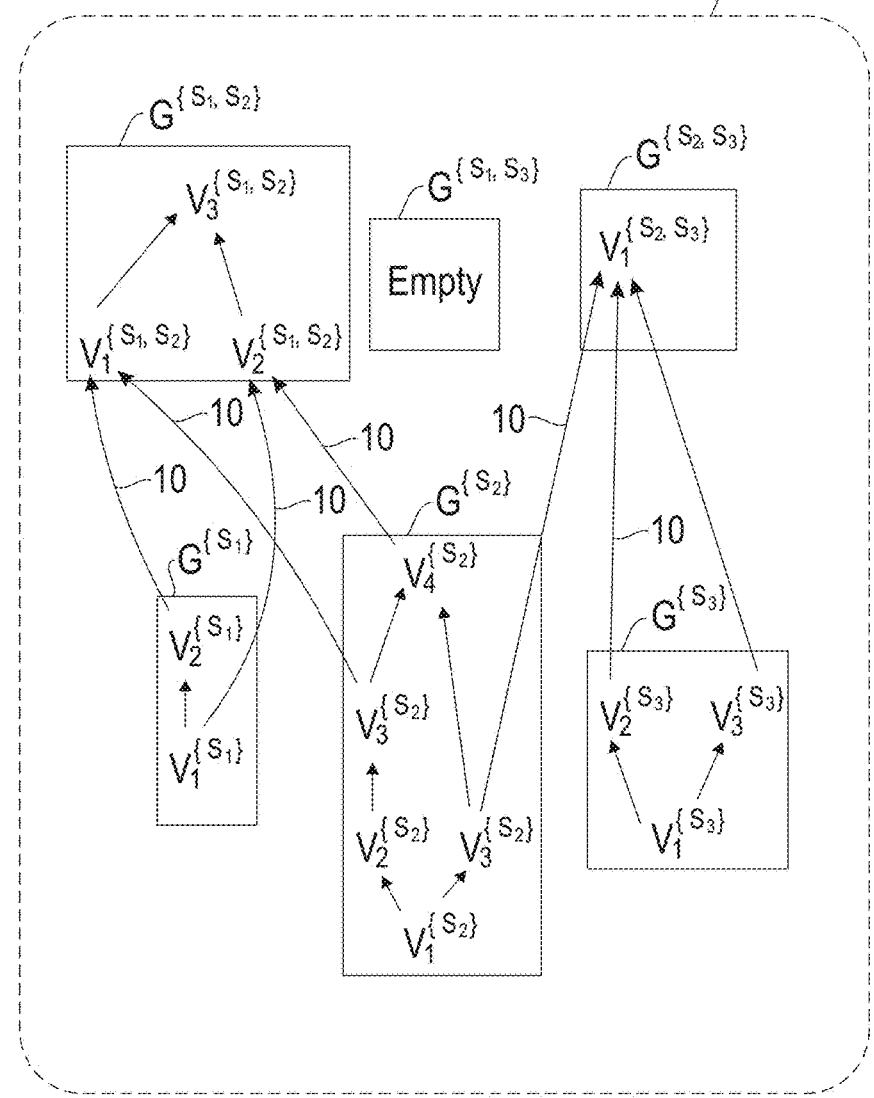
FIG. 5 illustrates a bottom-up digraph of the lattice, in accordance with an embodiment of the invention.

FIG. 5 illustrates a bottom-up digraph 200 of the lattice 100, in accordance with an embodiment of the invention. The lattice 100 further provides said acyclic bottom-up digraph 200 including all vertices and directed edges 10 of the digraphs $G^{\{S_1\}}$, $G^{\{S_2\}}$, $G^{\{S_3\}}$, $G^{\{S_1,S_2\}}$, $G^{\{S_1,S_3\}}$, $G^{\{S_2,S_3\}}$ and $G^{\{S_1,S_2,S_3\}}$. Specifically the bottom-up digraph 200 includes the vertices $V_1^{\{S_1\}}$, $V_2^{\{S_1\}}$, $V_1^{\{S_2\}}$, $V_2^{\{S_2\}}$, $V_3^{\{S_2\}}$, $V_4^{\{S_2\}}$, $V_1^{\{S_3\}}$, $V_2^{\{S_3\}}$, $V_3^{\{S_3\}}$, $V_1^{\{S_1,S_2\}}$, $V_2^{\{S_1,S_2\}}$, $V_3^{\{S_1,S_2\}}$, and $V_1^{\{S_2,S_3\}}$, and all directed edges 10 of the digraphs $G^{\{S_1\}}$, $G^{\{S_2\}}$, $G^{\{S_3\}}$, $G^{\{S_1,S_2\}}$, $G^{\{S_1,S_3\}}$, $G^{\{S_2,S_3\}}$, and $G^{\{S_1,S_2,S_3\}}$.

The set of directed edges $E^\uparrow$ for the bottom-up digraph $G^\uparrow$ may contain additional directed edges 10. Three constraints are provided below to ensure that $G^\uparrow$ is an acyclic digraph.

The first constraint is as follows: For S, T∈L, a directed edge from a vertex $V_i^S$ in $G^S$ to another vertex $V_j^T$ in $G^T$ can exist only if the set $\{S\}$ is a strict subset of the set $\{T\}$.

Referring back to FIG. 5, the bottom-up digraph 200 further comprises additional directed edges 10. Each directed edge 10 interconnects a vertex of a first node with a vertex of a second node, wherein the set represented by the first node is a subset of the set represented by the second node.

For example, the sets $\{S_1\}$ and $\{S_2\}$ are subsets of the set $\{S_1,S_2\}$. A first directed edge 10 interconnects the vertex $V_2^{\{S_1\}}$ to the vertex $V_1^{\{S_1,S_2\}}$, a second directed edge 10 interconnects the vertex $V_1^{\{S_2\}}$ to the vertex $V_2^{\{S_1,S_2\}}$ a third directed edge 10 interconnects the vertex $V_3^{\{S_2\}}$ to the vertex $V_1^{\{S_1,S_2\}}$, and a fourth directed edge 10 interconnects the vertex $V_4^{\{S_2\}}$ to the vertex $V_1^{\{S_1,S_2\}}$. Similarly, the sets $\{S_2\}$ and $\{S_3\}$ are subsets of the set $\{S_2,S_3\}$. A fifth directed edge 10 interconnects the vertex $V_3^{\{S_2\}}$ to the vertex $V_1^{\{S_2,S_3\}}$, a sixth directed edge 10 interconnects the vertex $V_2^{\{S_3\}}$ to the vertex $V_1^{\{S_2,S_3\}}$ and a seventh directed edge 10 interconnects the vertex $V_3^{\{S_3\}}$ to the vertex $V_1^{\{S_2,S_3\}}$.

The second constraint is as follows: The only source vertices in $G^\uparrow$ are the source vertices in the acyclic digraphs corresponding to the atomic sets, that is source($G^\uparrow$)=$\cup_{S\in A}$source($G^S$). For some S∈L, let $V_s^S$ denote a vertex in $V^S$. Let $S_j$ denote an atomic set that is a subset of S, and let $S_i$ denote an atomic set that is not a subset of S. For every vertex $V_s^S$ that is not a source vertex, a path from a source vertex to $V_s^S$ exists. There, however, can be no path from a source vertex in every atomic set $S_i$ to $V_s^S$.

Referring back to FIG. 5, each set $\{S_1\}$, $\{S_2\}$, and $\{S_3\}$ is an atomic set with the source vertex $V_1^{\{S_1\}}$, $V_1^{\{S_2\}}$, and $V_1^{\{S_3\}}$, respectively. Vertices $V_1^{\{S_1\}}$, and $V_1^{\{S_2\}}$ are the only vertices in the bottom-up digraph 200 that do not have incoming directed edges. All other vertices in the bottom-up digraph 200 have incoming directed edges. As such, the source vertices for the bottom-up digraph 200 comprise only the vertices $V_1^{\{S_1\}}$, $V_1^{\{S_2\}}$, and $V_1^{\{S_3\}}$. As illustrated in FIG. 5, a path exists from each source vertex $V_1^{\{S_1\}}$, $V_1^{\{S_2\}}$, and $V_1^{\{S_3\}}$ to the non-source vertices. For example, the first directed edge 10 in $G^{\{S_1\}}$ forms a path between the source vertex $V_1^{\{S_1\}}$ and the vertex $V_2^{\{S_1\}}$.

The third constraint is as follows: A vertex can be a sink in $G^\uparrow$ only if it is in $G^F$. Alternatively, a vertex can be a sink in $G^\uparrow$ only if it is in $G^S$ such that for every strict superset T of set S (i.e., T⊋S) where sets S, T∈L, $G^T$ is an empty acyclic digraph. Further, there must be at least one outgoing directed edge from every vertex in $G^S$ that is not a sink to some vertex in $G^T$, where T⊋S.

Referring back to FIG. 5, vertices $V_3^{\{S_1,S_2\}}$ and $V_1^{\{S_2,S_3\}}$ are the only vertices in the bottom-up digraph 200 that do not have outgoing directed edges. All the other vertices in the bottom-up digraph 200 have outgoing directed edges. As such, the sink vertices for the bottom-up digraph 200 comprise only the vertices $V_3^{\{S_1,S_2\}}$ and $V_1^{\{S_2,S_3\}}$. As illustrated in FIG. 5, a path exists from each non-sink vertex in S to a sink vertex in T, where T⊋S. For example, the fifth directed edge 10 forms a path between the non-sink vertex $V_3^{\{S_2\}}$ and the vertex $V_1^{\{S_2,S_3\}}$, where $\{S_2, S_3\}\supseteq\{S_2\}$.

For every S∈L, let $U^S$ be a set such that every element u∈$U^S$ corresponds to one and exactly one element in $V^S$, and vice versa. Thus, for every S∈L, there is a bijection between $U^S$ and $V^S$. Let u=$P^S(v)$ generally denote the bijection.

For every $G^S$, there is a corresponding acyclic digraph $H^S=(U^S, D^S)$ where, for $u_1=P^S(v_1)$ and $u_2=P^S(v_2)$, there is an edge from $u_1$ to $u_2$ in $D^S$ if and only if there is an edge from $v_2$ to $v_1$ in $E^S$. Further, the bottom-up digraph $G^\uparrow$ has a corresponding top-down digraph $H^\downarrow=(U^\downarrow, E^\downarrow)$, where $U^\downarrow$ comprises all vertices $\cup_{S\in L}U^S$. As stated above, there is a bijection between $U^S$ and $V^S$ for every S∈L. Accordingly, there is a natural one-to-one correspondence between elements of $U^\downarrow$ and $V^\uparrow$. For every v∈$V^\uparrow$, let P(v) denote its corresponding element in $U^\downarrow$. For $u_1=P(v_1)$ and $u_2=P(v_2)$, there is an edge from $u_1$ to $u_2$ in $E^\downarrow$ if and only if there is an edge from $v_2$ to $v_1$ in $E^\uparrow$. For every v∈$G^\uparrow$ that is a source, the bijection u=P(v) in $H^\downarrow$ is a sink. For every v∈$G^\uparrow$ that is a sink, the bijection u=P(v) in $H^\downarrow$ is a source.

Therefore, each vertex in the top-down digraph $H^\downarrow$ corresponds to a vertex in the bottom-up digraph $G^\uparrow$, and each directed edge 10 in the top-down digraph $H^\downarrow$ corresponds to a directed edge 10 in the bottom-up digraph $G^\uparrow$. Information flows along a directed edge 10 in the top-down digraph $H_\uparrow$ in a first direction, and information flows along a corresponding directed edge 10 in the bottom-up digraph in a direction opposite of the first direction.

Figure 6:
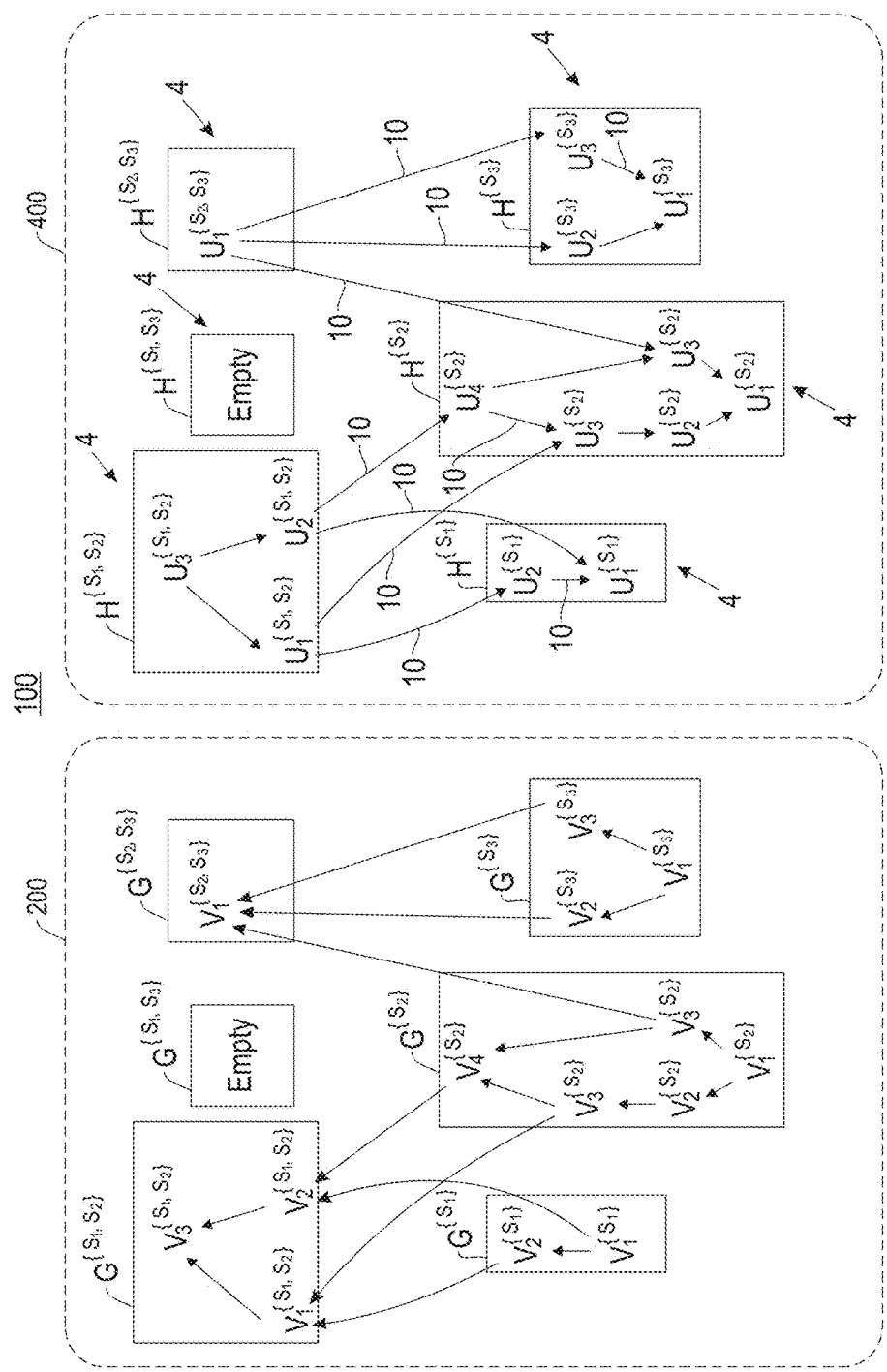
FIG. 6 illustrates a lattice including a top-down digraph corresponding to a bottom-up digraph of the lattice, in accordance with an embodiment of the invention.

FIG. 6 illustrates the lattice 100 including a top-down digraph 400 corresponding to the bottom-up digraph 200, in accordance with an embodiment of the invention. The top-down digraph 400 comprises acyclic digraphs $H^{\{S_1\}}$, $H^{\{S_2\}}$, $H^{\{S_3\}}$, $H^{\{S_1,S_2\}}$, $H^{\{S_1,S_3\}}$, and $H^{\{S_2,S_3\}}$ corresponding to the acyclic digraphs $G^{\{S_1\}}$, $G^{\{S_2\}}$, $G^{\{S_3\}}$, $G^{\{S_1,S_2\}}$, $G^{\{S_1,S_3\}}$, $G^{\{S_2,S_3\}}$ in the bottom-up digraph 200, respectively.

Specifically, the digraph $H^{\{S_1\}}$ comprises vertices $U_1^{\{S_1\}}$ and $U_2^{\{S_1\}}$ corresponding to the vertices $V_1^{\{S_1\}}$ and $V_2^{\{S_1\}}$ in the digraph $G^{\{S_1\}}$, respectively. The vertex $V_1^{\{S_1\}}$ is a source, whereas the vertex $V_1^{\{S_1\}}$, the bijection of $V_1^{\{S_1\}}$, is a sink. For every directed edge 10 in the digraph $G^{\{S_1\}}$, there is a reciprocal directed edge 10 in the digraph $H^{\{S_1\}}$. For example, a directed edge 10 interconnecting the vertex $U_2^{\{S_1\}}$ to the vertex $U_1^{\{S_1\}}$ in the digraph $H^{\{S_1\}}$ corresponds to the directed edge 10 interconnecting the vertex $V_1^{\{S_1\}}$ to in the vertex $V_2^{\{S_1\}}$ in the digraph $G^{\{S_1\}}$.

The digraph $H^{\{S_2\}}$ comprises vertices $U_1^{\{S_2\}}$, $U_2^{\{S_2\}}$, $U_3^{\{S_2\}}$, and $U_4^{\{S_2\}}$ corresponding to the vertices $V_1^{\{S_2\}}$, $V_2^{\{S_2\}}$, $V_3^{\{S_2\}}$, and $V_4^{\{S_2\}}$ in the digraph $G^{\{S_2\}}$ respectively. The vertex $V_1^{\{S_2\}}$ is a source, whereas the vertex $U_1^{\{S_2\}}$, the bijection of $V_1^{\{S_2\}}$, is a sink. For every directed edge 10 in the digraph $G^{\{S_2\}}$ there is a reciprocal directed edge 10 in the digraph $H^{\{S_2\}}$. For example, a directed edge 10 interconnecting the vertex $U_2^{\{S_2\}}$ to the vertex $U_1^{\{S_2\}}$ in the digraph $H^{\{S_2\}}$ corresponds to the directed edge 10 interconnecting the vertex $V_1^{\{S_2\}}$ to the vertex $V_2^{\{S_2\}}$ in the digraph $G^{\{S_2\}}$.

The digraph $H^{\{S_3\}}$ comprises vertices $U_1^{\{S_3\}}$, $U_2^{\{S_3\}}$, and $U_3^{\{S_3\}}$ corresponding to the vertices $V_1^{\{S_3\}}$, $V_2^{\{S_3\}}$, and $V_3^{\{S_3\}}$ in the digraph $G^{\{S_3\}}$, respectively. The vertex $V_1^{\{S_3\}}$ is a source, whereas the vertex $U_1^{\{S_3\}}$, the bijection of $V_1^{\{S_3\}}$, is a sink. For every directed edge 10 in the digraph $G^{\{S_3\}}$, there is a reciprocal directed edge 10 in the digraph $H^{\{S_3\}}$. For example, a directed edge 10 interconnecting the vertex $U_2^{\{S_3\}}$ to the vertex $U_1^{\{S_3\}}$ in the digraph $H^{\{S_3\}}$ corresponds to the directed edge 10 interconnecting the vertex $V_1^{\{S_3\}}$ to the vertex $V_2^{\{S_3\}}$ in the digraph $G^{\{S_3\}}$.

The digraph $H^{\{S_1,S_2\}}$ comprises vertices $U_1^{\{S_1,S_2\}}$, $U_2^{\{S_1,S_2\}}$, and $U_3^{\{S_1,S_2\}}$ corresponding to the vertices $V_1^{\{S_1,S_2\}}$, $V_2^{\{S_1,S_2\}}$ and $V_3^{\{S_1,S_2\}}$ in the digraph $G^{\{S_1,S_2\}}$, respectively. The vertex $V_3^{\{S_1,S_2\}}$ is a sink, whereas the vertex $U_3^{\{S_1,S_2\}}$, the bijection of $V_3^{\{S_1,S_2\}}$, is a source. For every directed edge 10 in the digraph $G^{\{S_1,S_2\}}$, there is a reciprocal directed edge 10 in the digraph $H^{\{S_1,S_2\}}$. For example, a directed edge 10 interconnecting the vertex $U_3^{\{S_1,S_2\}}$ to the vertex $U_1^{\{S_1,S_{23}\}}$ in the digraph $H^{\{S_1,S_2\}}$ corresponds to the directed edge 10 interconnecting the vertex $V_1^{\{S_1,S_2\}}$ to the vertex $V_3^{\{S_1,S_2\}}$ in the digraph $G^{\{S_1,S_2\}}$.

Like the digraph $G^{\{S_1,S_3\}}$ the digraph $H^{\{S_1,S_3\}}$ is an empty digraph.

The digraph $H^{\{S_2,S_3\}}$ comprises a vertex $U_1^{\{S_2,S_3\}}$ corresponding to the vertex $V_1^{\{S_2,S_3\}}$ in the digraph $G^{\{S_2,S_3\}}$, respectively. The vertex $V_1^{\{S_2,S_3\}}$ is a sink, whereas the vertex $U_1^{\{S_2,S_3\}}$, the bijection of $V_1^{\{S_2,S_3\}}$, is a source.

The top-down digraph 400 further comprises additional directed edges 10. Specifically, for every directed edge 10 in the bottom-up digraph 200, there is a reciprocal directed edge 10 in the top-down digraph 400. For example, a directed edge 10 interconnecting the vertex $U_1^{\{S_1,S_2\}}$ in the digraph $H^{\{S_1,S_2\}}$ to the vertex $U_2^{\{S_1\}}$ in the digraph $H^{\{S_1\}}$ corresponds to the directed edge 10 interconnecting the vertex $V_2^{\{S_1\}}$ in the digraph $G^{\{S_1\}}$ to the vertex $V_1^{\{S_1,S_2\}}$ in the digraph $G^{\{S_1,S_2\}}$.

Vertices in the bottom-up digraph $G^\uparrow$ are interconnected via the directed edges 10 to form bottom-up signaling pathways along which information flows in a first direction. Vertices in the top-down digraph $H^\downarrow$ are interconnected via the directed edges 10 to form top-down signaling pathways along which information flows in a direction opposite to the first direction. The bottom-up digraph $G^\uparrow$ and the top-down digraph $H^\downarrow$ may be connectable to provide a combined acyclic perception-action $G=(V, E)$, where $V=V^\uparrow \cup U^\downarrow$ and E contains all the directed edges $E^\uparrow \cup E^\downarrow$.

Figure 7:
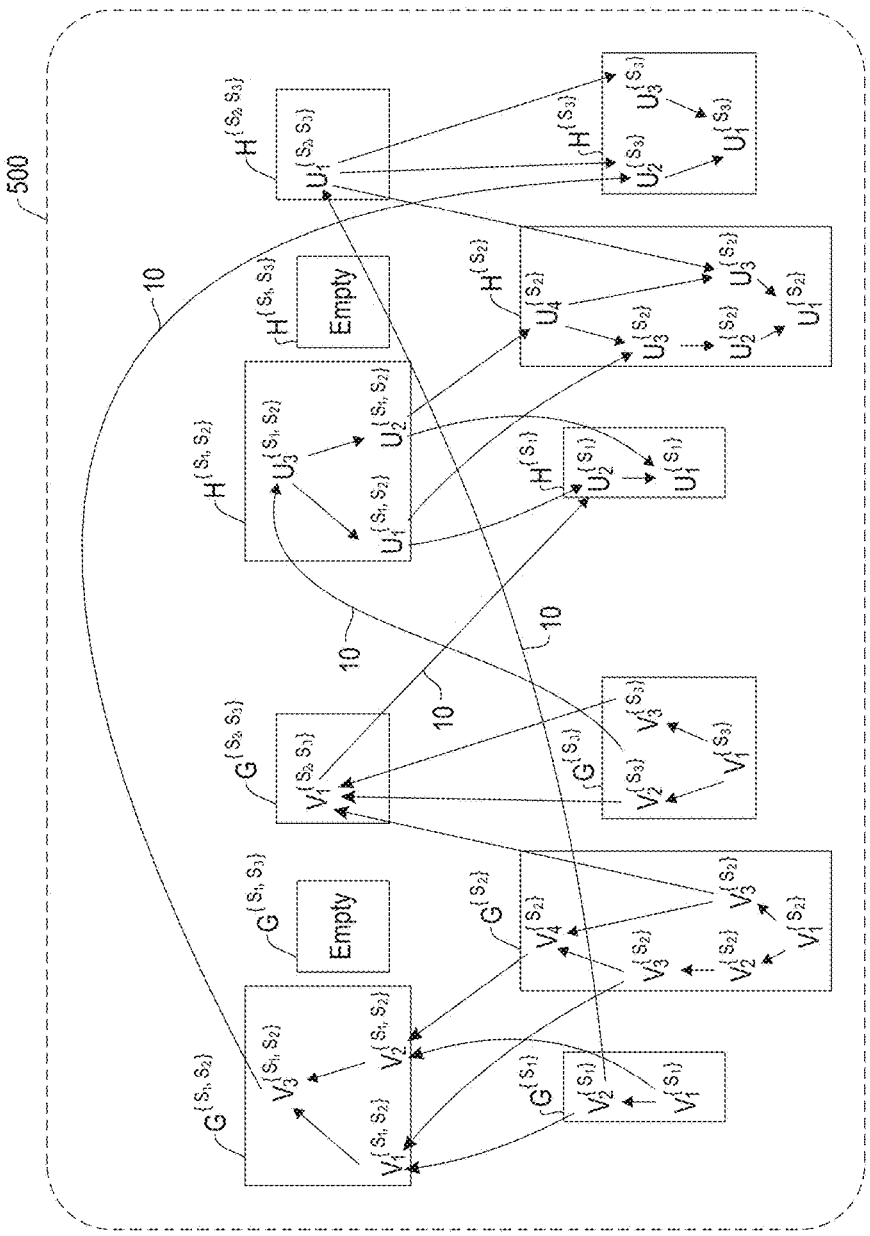
FIG. 7 illustrates a lattice including a combined perception-action graph, in accordance with an embodiment of the invention.

FIG. 7 illustrates the lattice 100 including a combined perception-action graph 500, in accordance with an embodiment of the invention. The perception-action graph 500 comprises all vertices in the bottom-up digraph 200 and the top-down digraph 400. The perception-action graph 500 further comprises all directed edges 10 in the bottom-up digraph 200 and the top-down digraph 400.

The set of edges E of the perception-action graph G may contain additional directed edges 10. Three constraints are provided below to ensure that G is an acyclic digraph, and that for every directed edge 10 interconnecting a vertex v to a vertex u, there is a reciprocal directed edge interconnecting a vertex P(u) to a vertex P(v), where the vertices v, u, P(v), P(u)∈G.

The first constraint is as follows: Every vertex in sink($G^\uparrow$) must have an outgoing directed edge, and every vertex in source($H^\downarrow$) must have an incoming directed edge. Let source(G)=source($G^\uparrow$), and let sink(G)=sink($H^\downarrow$).

As described above, the sink vertices in the bottom-up digraph 200 are the vertices $V_3^{\{S_1,S_2\}}$ and $V_1^{\{S_2,S_3\}}$ and the source vertices in the top-down digraph 400 are the vertices $U_3^{\{S_1,S_2\}}$ and $U_1^{\{S_2,S_3\}}$. Referring back to FIG. 7, each vertex $V_3^{\{S_1,S_2\}}$ and $V_1^{\{S_2,S_3\}}$ in the bottom-up digraph 200 now has an outgoing directed edge 10. Specifically, a directed edge 10 interconnects the vertex $V_3^{\{S_1,S_2\}}$ to the vertex $U_2^{\{S_3\}}$, and a directed edge 10 interconnects the vertex $V_1^{\{S_2,S_3\}}$ to the vertex $U_2^{\{S_1\}}$. Each vertex $U_3^{\{S_1,S_2\}}$ and $U_1^{\{S_2,S_3\}}$ in the top-down digraph 400 now has an incoming directed edge 10. Specifically, a directed edge 10 interconnects the vertex $V_2^{\{S_3\}}$ to the vertex $U_3^{\{S_1,S_2\}}$, and a directed edge 10 interconnects the vertex $V_2^{\{S_1\}}$ to the vertex $U_1^{\{S_2,S_3\}}$.

The source vertices in the perception-action graph 500 are the vertices $V_1^{\{S_1\}}$, $V_1^{\{S_2\}}$, and $V_1^{\{S_3\}}$. The sink vertices in the perception-action graph 500 are the vertices $U_1^{\{S_1\}}$, $U_1^{\{S_2\}}$, and $U_1^{\{S_3\}}$.

The second constraint is as follows: For a vertex $v \in V^S$, where $V_S \subset V^\uparrow$, and for a vertex $u \in U^T$, where $U^T \subset V^\downarrow$, v and u are connectable if $S \cap T=0$. If v and u are connectable, then E may contain a pair of directed edges 10 from v to u and from P(v) to $P^{-1}(u)$. For example, referring back to FIG. 7, $P(V_2^{\{S_1\}})$ and $P^{-1}(U_1^{\{S_2,S_3\}})$ are the vertices $U_2^{\{S_1\}}$ and $V_1^{\{S_2,S_3\}}$, respectively. The directed edge 10 interconnecting the vertex $V_1^{\{S_2,S_3\}}$ to the vertex $U_2^{\{S_1\}}$ has a reciprocal directed edge 10 interconnecting the vertex $V_2^{\{S_1\}}$ to the vertex $U_1^{\{S_2,S_3\}}$. Similarly, $P(V_3^{\{S_1,S_2\}})$ and $P^{-1}(U_2^{\{S_3\}})$ are the vertices $U_3^{\{S_1,S_2\}}$ and $V_2^{\{S_3\}}$, respectively. The directed edge 10 interconnecting the vertex $V_3^{\{S_1,S_2\}}$ to the vertex $U_2^{\{S_3\}}$ has a reciprocal directed edge 10 interconnecting the vertex $V_2^{\{S_3\}}$ to the vertex $U_3^{\{S_1,S_2\}}$. This second constraint ensures that information arising from a source vertex never feedbacks into itself. Thus, for prediction purposes, the prediction of each modality can be based other modalities but not itself.

In one embodiment, the third constraint is as follows: To enable estimation (i.e., auto-association), a vertex $v \in V^S$ is equated to a vertex $P(V) \in U^S$, where $V^S \subset V^\uparrow$, and $U^S \subset U^\downarrow$.

Figure 8:
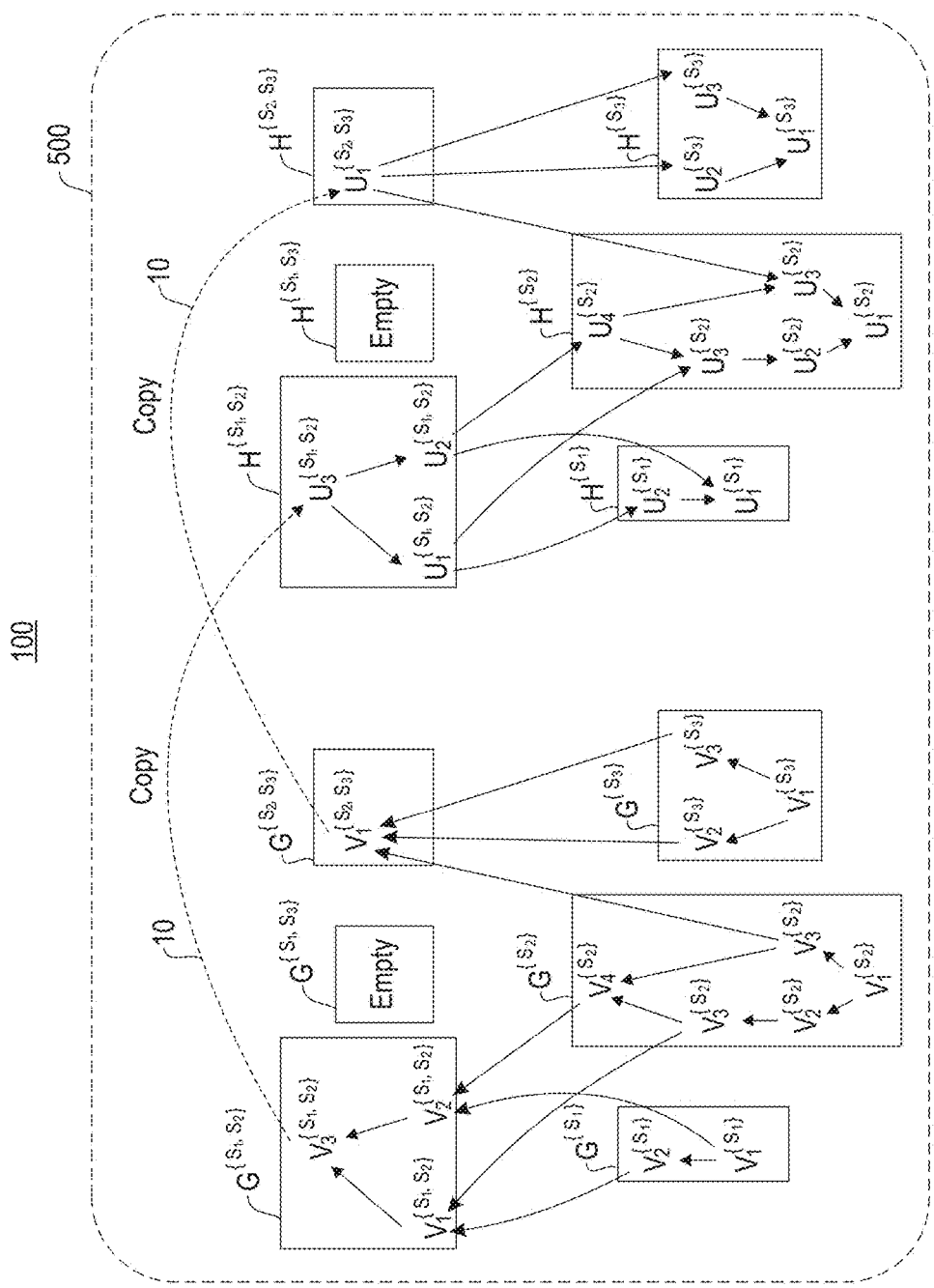
FIG. 8 illustrates a lattice including a combined perception-action graph, in accordance with another embodiment of the invention.

FIG. 8 illustrates the lattice 100 including the combined perception-action graph 500, in accordance with another embodiment of the invention. To equate the vertex $V_3^{\{S_1,S_2\}}$ to the vertex $U_3^{\{S_1,S_2\}}$ (i.e., $P(V_3^{\{S_1,S_2\}})$), output of the vertex $V_3^{\{S_1,S_2\}}$ is copied to the vertex $U_3^{\{S_1,S_2\}}$. Similarly, to equate the vertex $V_1^{\{S_2,S_3\}}$ to the vertex $U_1^{\{S_2,S_3\}}$ (i.e., $P(V_1^{\{S_2,S_3\}})$), output of the vertex $V_1^{\{S_2,S_3\}}$ is copied to the vertex $U_1^{\{S_2,S_3\}}$.

In another embodiment, the third constraint is as follows: A vertex $v \in V^S$ is connectable to vertex $u \in U^T$, where $V^S \subset V^\uparrow$, $U^T \subset V^\downarrow$, and S=T. If v and u are connectable, then E may contain a pair of directed edges from v to u and from P(v) to $P^{-1}(u)$.

Figure 9:
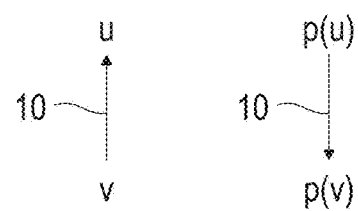
FIG. 9 illustrates a bijection between vertices, in accordance with an embodiment of the invention.

FIG. 9 illustrates the bijection between vertices, in accordance with an embodiment of the invention. As described above, for every directed edge interconnecting a vertex v to a vertex u, there is a reciprocal directed edge interconnecting a vertex P(u) to a vertex P(v), where the vertices v, u, P(v), P(u)∈G.

Using the perception-action graph G described above, embodiments of a neural network substrate ("neural network") suitable for supervised and unsupervised learning are now disclosed herein below. Every vertex v∈V↑ (i.e., a vertex in the bottom-up digraph G↑) comprises a neuron population of perception neurons generally denoted as N(v). Every vertex P(v)∈V↓ (i.e., a vertex in the top-down digraph H↓) comprises another neuron population of action neurons generally denoted as N(P(v)). Each directed edge 10 interconnecting a sending vertex to a receiving vertex comprises multiple synaptic connections 5 such that a neuron in a neuron population corresponding to the receiving vertex receives synaptic connections from a subset of neurons in a neuron population corresponding to the second vertex.

Figure 10:
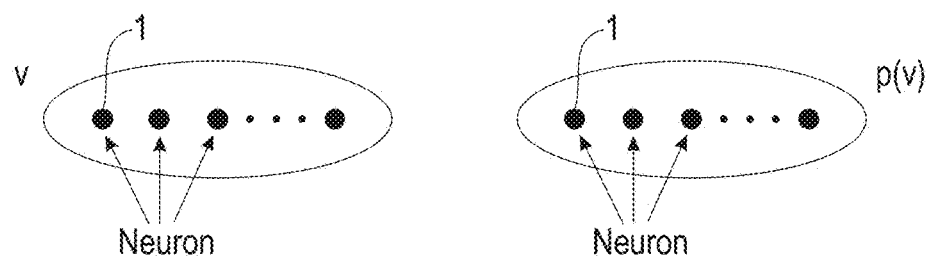
FIG. 10 illustrates neuron populations of vertices, in accordance with an embodiment of the invention.

FIG. 10 illustrates neuron populations of vertices, in accordance with an embodiment of the invention. For any vertex v∈V↑, the vertex v comprises a neuron population including multiple neurons 1, wherein the neurons 1 are perception neurons. The bijection of v, that is P(v)∈V↓, similarly comprises another neuron population including multiple neurons 1, wherein the neurons 1 are action neurons. The total number of neurons 1 in the vertex v is the same as the total number of neurons in the vertex P(v). Each neuron in the vertex v corresponds to exactly one neuron in the vertex P(v).

Figure 11:
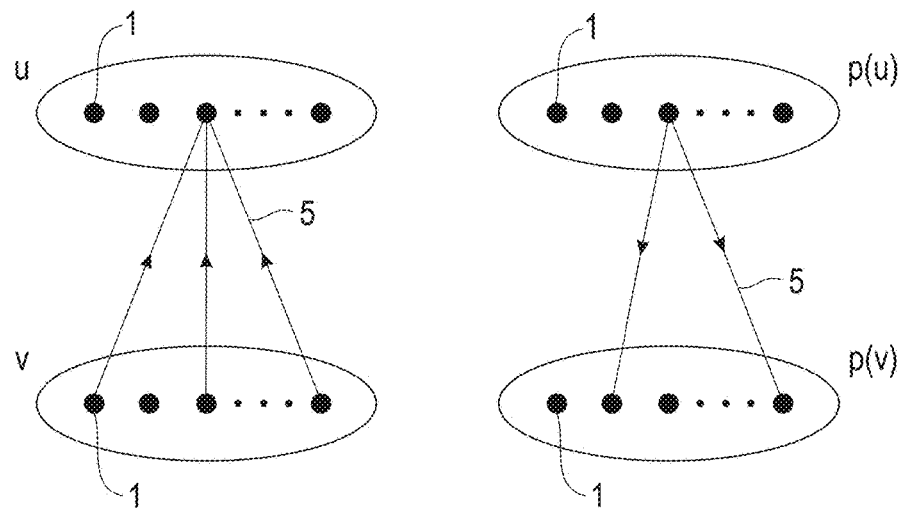
FIG. 11 illustrates an example of synaptic connections between neuron populations, in accordance with an embodiment of the invention.

FIG. 11 illustrates an example of synaptic connections 5 between neuron populations, in accordance with an embodiment of the invention. For a directed edge 10 (FIG. 9) interconnecting a vertex v in G to a vertex u in G, every neuron 1 in the vertex u receives some synaptic connections 5 from a set of neurons 1 in the vertex v. Each synaptic connection 5 has a plastic, adaptive weight.

In one embodiment, every neuron 1 in the vertex u receives synaptic connections 5 from every neuron 1 in the vertex v. In another embodiment, every neuron in the vertex u receives synaptic connections 5 from a subset of neurons in the vertex v. In yet another embodiment, every neuron in the vertex u receives connections from a random subset of neurons in the vertex v.

Similarly, for the reciprocal directed edge 10 (FIG. 9) interconnecting a vertex P(u) to a vertex P(v), every neuron in the vertex P(v) receives some synaptic connections 5 from a set of neurons 1 in the vertex P(u). The synaptic connections 5 between the vertex v and the vertex u need not be symmetric with the synaptic connections 5 between the vertex P(u) and the vertex P(v).

In a neural network suitable for supervised and unsupervised learning, weights of the synaptic connections 5 are first initialized. Activation then propagates in the neural network as follows: In every epoch (e.g., time step), training patterns are presented to neurons 1 in all or some source vertices. The neurons 1 in the source vertices are perception neurons. As source vertices are vertices at an input periphery of the neural network, the neurons 1 in the source vertices are designated as input neurons.

Other neurons 1 corresponding to non-source vertices then determine whether to emit a firing signal only after all the input neurons have determined whether to emit a firing signal. Activation is propagated through the neural network until all neurons 1 have fired. Since the neural network is acyclic, there can be no deadlock, and every neuron 1 will eventually fire.

In one embodiment, every neuron 1 is trained according to perceptron learning rules. Specifically, every neuron 1 has a target output. For every perception neuron 1 in a vertex v, the target output is simply the output of the corresponding action neuron 1 in the vertex P(v), and vice versa. In another embodiment, Winnow learning rules or its variants may be used for training the neurons 1.

Figure 12:
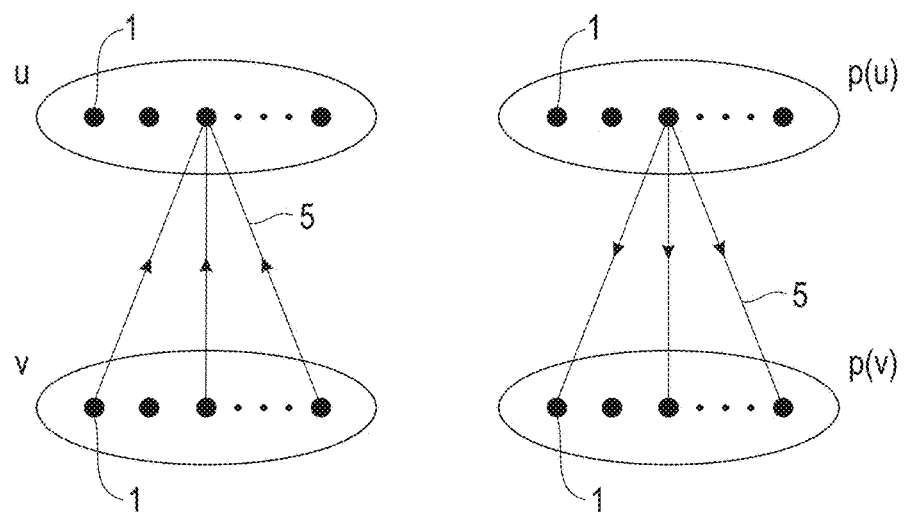
FIG. 12 illustrates another example of synaptic connections between neuron populations, in accordance with an embodiment of the invention.

FIG. 12 illustrates another example of synaptic connections 5 between neuron populations, in accordance with an embodiment of the invention. As described above, if there is a directed edge 10 (FIG. 9) interconnecting a vertex v in G to a vertex u in G, then every neuron in the vertex u receives some synaptic connections 5 from a set of neurons 1 in the vertex v. Unlike FIG. 10, the synaptic connections 5 between the vertex v and the vertex u are symmetric with the synaptic connections 5 between the vertex P(u) and the vertex P(v). For a synaptic connection 5 from a first neuron 1 in the vertex v to a second neuron 1 in the vertex u, there is a reciprocal synaptic connection 5 from a third neuron 1 in the vertex P(u) to a fourth neuron 1 in the vertex P(v), where the fourth neuron corresponds to the first neuron and the third neuron corresponds to the second neuron.

In one embodiment, each synaptic connection 5 has an adaptive, plastic weight. In another embodiment, the synaptic connection 5 interconnecting the first neuron to the second neuron has the same weight as the reciprocal synaptic connection 5 interconnecting the third neuron to the fourth neuron.

In one embodiment, the neurons 1 are spiking neurons. For spiking neurons, an example learning rule is described as follows: If a perception neuron n along a bottom-up pathway fires, a spike-timing dependent Hebbian learning function may be applied between the last firing time of the corresponding action neuron P(n) along a corresponding top-down pathway and the last firing times of pre-synaptic neurons to the neuron n (i.e., the neurons that send out outgoing synaptic connections 5 to the neuron n). Similarly, if an action neuron m along a top-down pathway fires, a spike-timing dependent Hebbian learning function may be applied between the last firing time of the corresponding perception neuron $P^{-1}(m)$ along the corresponding bottom-up pathway and the respective last firing times of the pre-synaptic neurons to the neuron m (i.e., the neurons that send out outgoing synaptic connections 5 to the neuron m).

Other learning rules for the spiking neurons may also be used. In one embodiment, the weight of each synaptic connection 5 cannot be negative. In another embodiment, the weight of each synaptic connection 5 may be negative.

Figure 13:
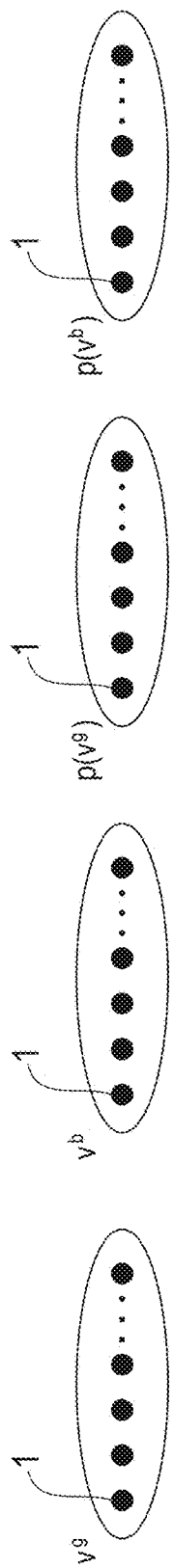
FIG. 13 illustrates another example of neuron populations, in accordance with an embodiment of the invention.

FIG. 13 illustrates another example of neuron populations, in accordance with an embodiment of the invention. In one embodiment, for every vertex v∈V in the perception-action graph G, vertices $v^g$ and $v^b$ are provided. Each vertex $v^g$ comprises a neuron population comprising multiple neurons 1, wherein each neuron 1 is a good perception neuron. Each vertex $v^b$ comprises another neuron population comprising multiple neurons 1, wherein each neuron 1 is a bad perception neuron. The total number of neurons 1 in the vertex $v^g$ is the same as the total number of neurons in the vertex $v^b$ such that each neuron in the vertex $v^g$ corresponds to exactly one neuron in the vertex $v^g$.

The bijection of $v^g$, that is the vertex $P(v^g)$∈V, comprises another neuron population comprising multiple neurons 1, wherein each neuron is a good action neuron. The bijection of $v^b$, that is the vertex $P(v^b)$∈V, comprises another neuron population comprising multiple neurons 1, wherein each neuron is a bad action neuron. The total number of neurons 1 in the vertex $P(v^g)$ is the same as the total number of neurons in the vertex $P(v^b)$ such that each neuron in the vertex $P(v^g)$ corresponds to exactly one neuron in the vertex $P(v^g)$. As such, there will be equal number of neurons 1 in each vertex $v^g$, $v^b$, $P(v^g)$, and $P(v^b)$.

Figure 14:
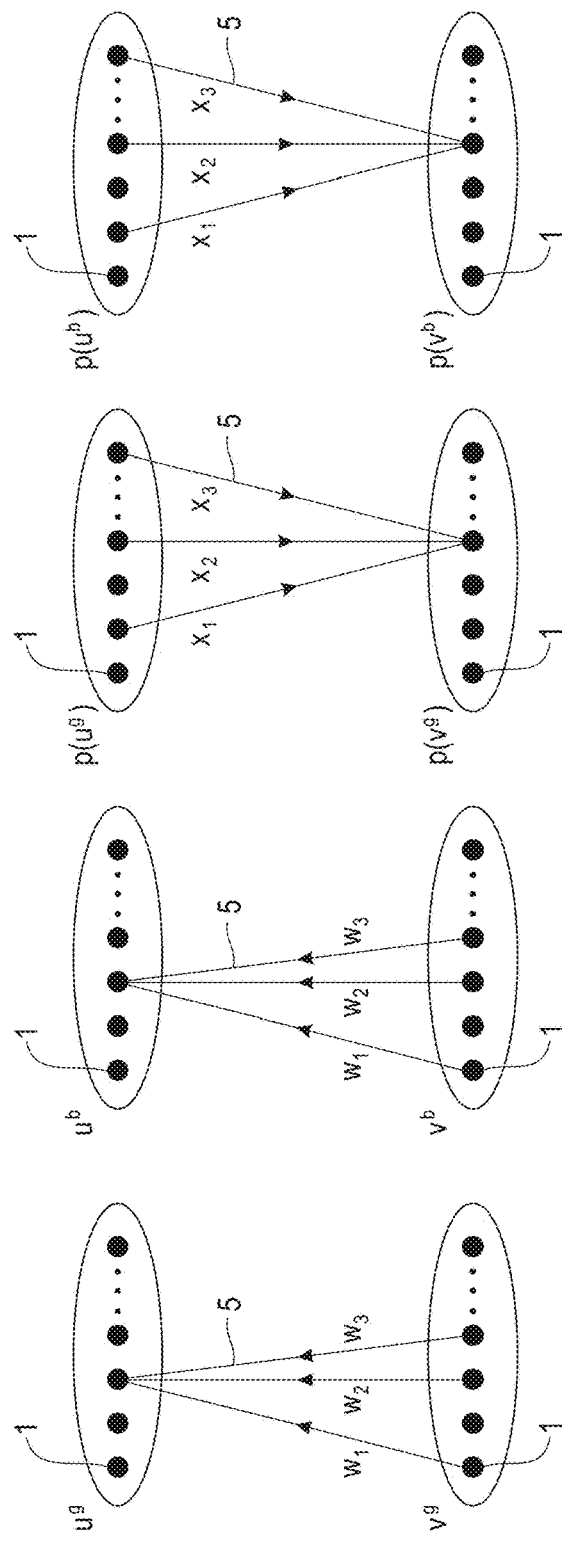
FIG. 14 illustrates yet another example of synaptic connections between neuron populations.

FIG. 14 illustrates yet another example of synaptic connections 5 between neuron populations, in accordance with an embodiment of the invention. Let n and m generally denote a neuron 1 in the vertex $v^g$ and a neuron 1 in the vertex $u^g$, respectively. For every synaptic connection 5 with a weight w interconnecting a neuron n of the vertex $v^g$ to a neuron m of the vertex $u^g$, there is a synaptic connection 5 with the same weight w interconnecting a neuron corresponding to n in the vertex $v^b$ to a neuron corresponding to m in the vertex $u^b$. Further, there are reciprocal synaptic connections between the vertex $P(u^g)$ and the vertex $P(v^g)$ and the vertex $P(u^b)$ and the vertex $P(v^b)$. The reciprocal synaptic connections 5 have the same weight x.

Figure 15:
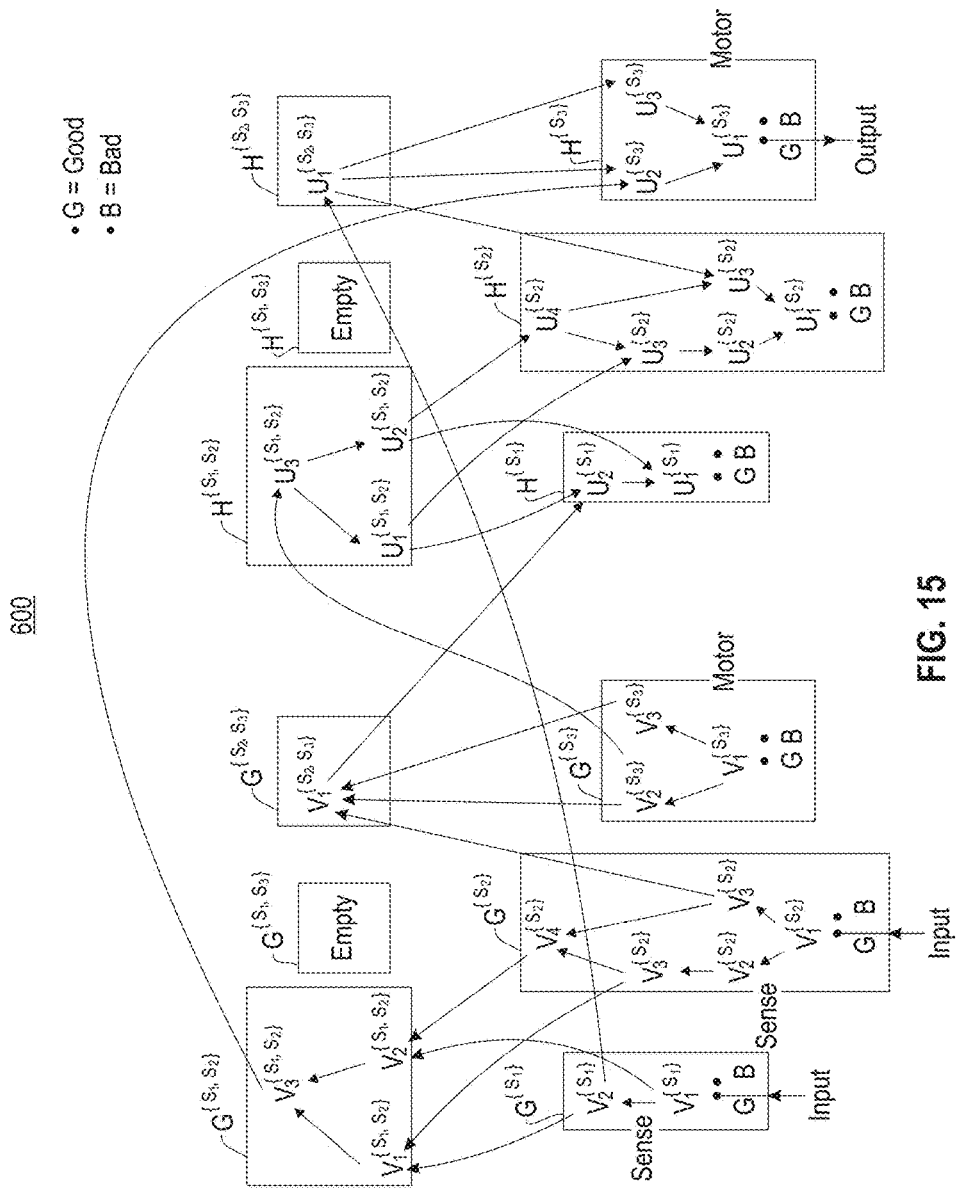
FIG. 15 illustrates an example neural network, in accordance with an embodiment of the invention.

FIG. 15 illustrates an example neural network 600, in accordance with an embodiment of the invention. There must be at least one sensory modality in a neural network. The neural network 600 utilizes the lattice 100 (FIG. 7) to interconnect the motor modality $S_3$ and the sensory modalities $S_1$ and $S_2$. Each vertex provides vertices $v^g$ and $v^b$ (FIG. 13) comprising a population of good neurons (G) and a population of bad neurons (B), respectively. For each source vertex in an acyclic digraph representing a sensory modality, good neurons in said source vertex receive sensory input for the sensory modality. As illustrated in FIG. 15, the good neurons in the source vertices and $V_1^{\{S_1\}}$ and $V_1^{\{S_2\}}$ are configured to receive sensory input. For each sink vertex in an acyclic digraph representing a motor modality, good neurons in said sink vertex are configured to generate motor output. As illustrated in FIG. 15, the good neurons in the sink vertex $U_1^{\{S_3\}}$ are configured to generate motor output.

Figure 16:
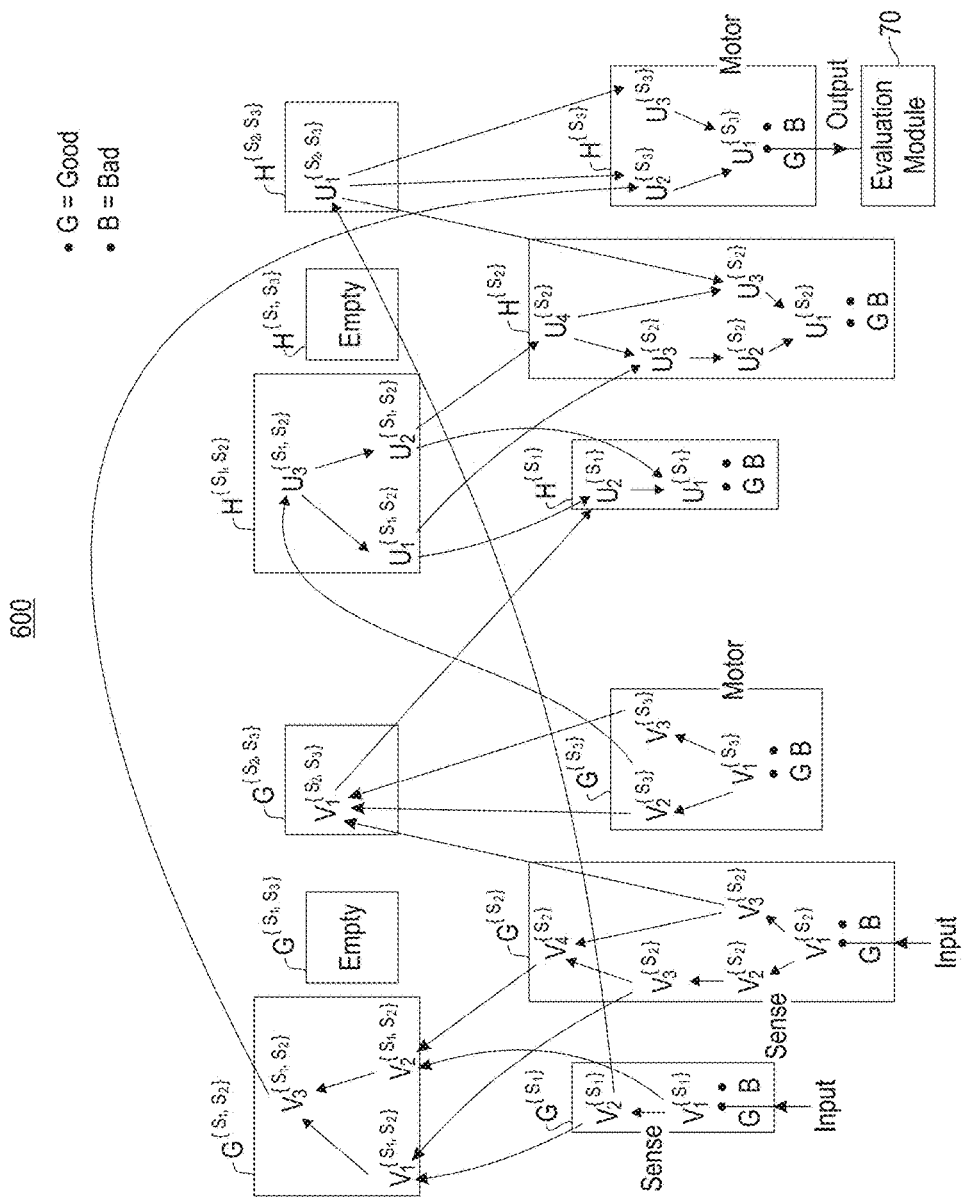
FIG. 16 illustrates a neural network with an evaluation module, in accordance with an embodiment of the invention.

FIG. 16 illustrates the neural network 600 with an evaluation module 70, in accordance with an embodiment of the invention. In another embodiment, the neural network 600 further comprises said evaluation module 70. For each sink vertex in an acyclic digraph representing a motor modality, motor output of the good neurons in said sink vertex are forwarded to the evaluation module 70. As illustrated in FIG. 16, motor output of the good neurons in the sink vertex $U_1^{\{S_3\}}$ are forwarded to the evaluation module 70. In one example implementation, each motor modality has its own corresponding evaluation module 70. In another example implementation, the evaluation module 70 receives input from multiple motor modalities.

Figure 17:
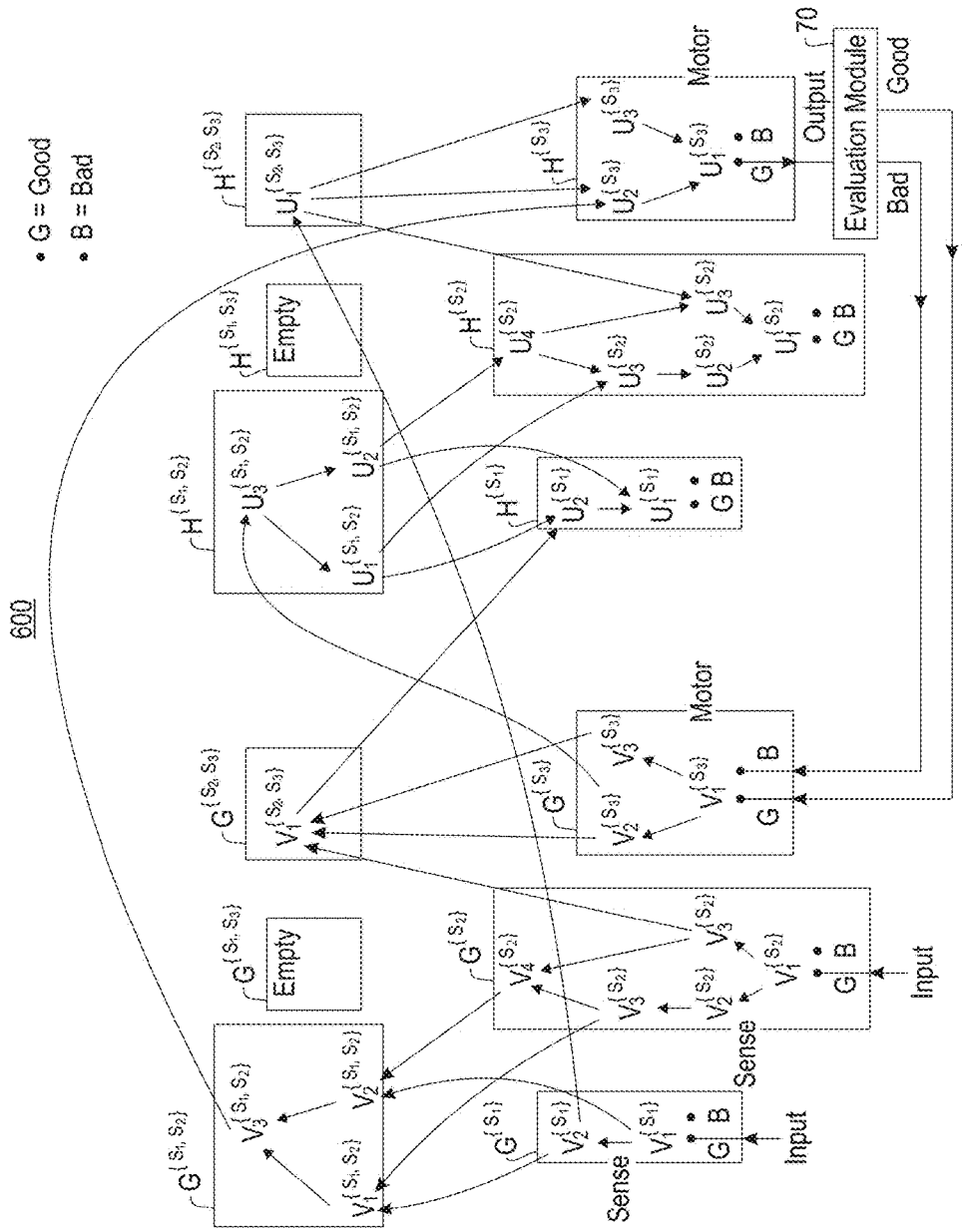
FIG. 17 illustrates a neural network with an evaluation module, in accordance with an embodiment of the invention.

FIG. 17 illustrates the neural network 600 with the evaluation module 70, in accordance with an embodiment of the invention. The evaluation module 70 determines if the motor output received from the good neurons in the sink vertex is good or bad. If the motor output is good, the evaluation module 70 forwards the good motor output to the good neurons in the corresponding source vertex of the motor modality. If the motor output is bad, the evaluation module 70 forwards the bad motor output to the bad neurons in the corresponding source vertex of the motor modality. As illustrated in FIG. 17, good motor output of the good neurons in the sink vertex $U_1^{\{S_3\}}$ is forwarded to the good neurons in the corresponding source vertex $V_1^{\{S_3\}}$. Bad motor output of the good neurons in the sink vertex $U_1^{\{S_3\}}$ is forwarded to the bad neurons in the corresponding source vertex $V_1^{\{S_3\}}$.

Figure 18:
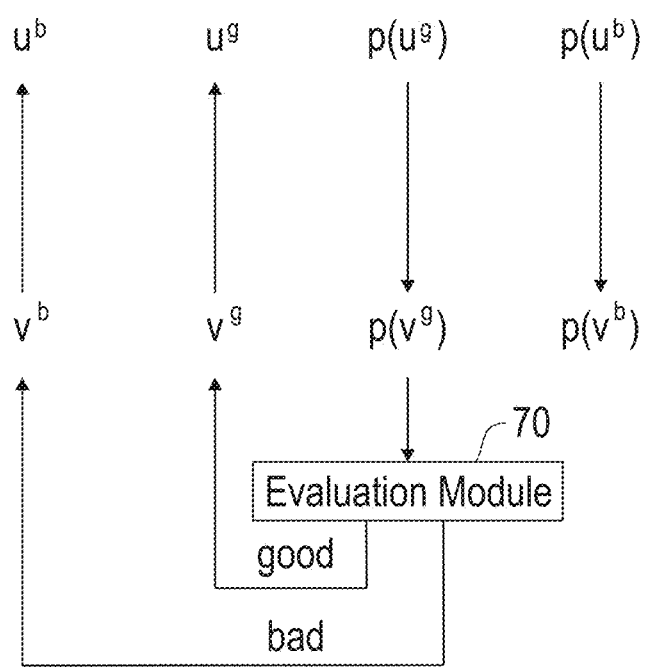
FIG. 18 illustrates an evaluation module 70 of a neural network, in accordance with an embodiment of the invention.

FIG. 18 illustrates the evaluation module 70 of the neural network 600 (FIG. 17), in accordance with an embodiment of the invention. If the motor output of the neurons in the vertex $P(v^g)$ is good, the evaluation module 70 feeds the good motor output to the neurons in the corresponding source vertex $v^g$, and a zero input to the neurons in the corresponding source vertex $v^b$. If the motor output of the neurons in the vertex $P(v^g)$ is bad, the evaluation module 70 feeds the bad motor output to the neurons in the corresponding source vertex $v^b$, and a zero input to the neurons in the corresponding source vertex $v^g$. Deadlock in activation propagation is thus prevented.

Figure 19A:
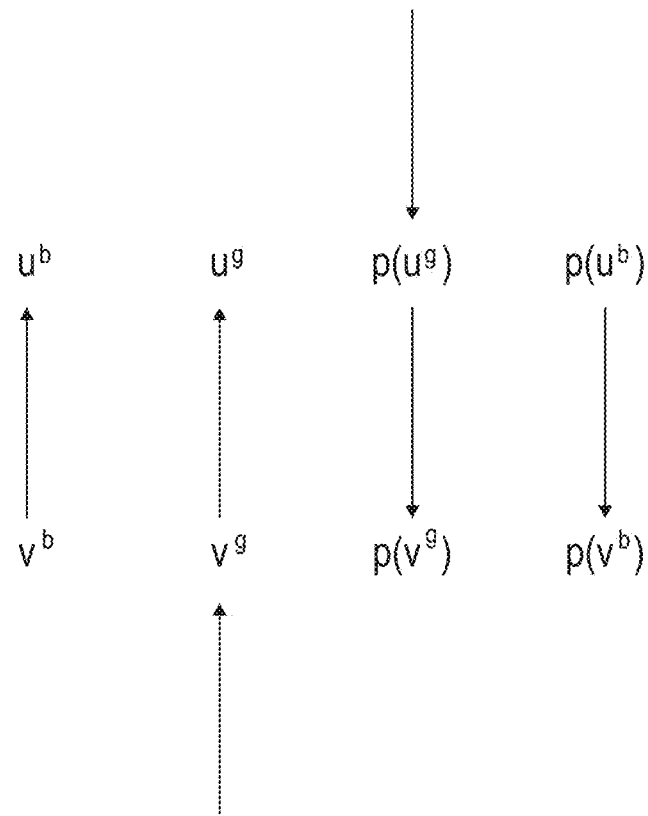
FIG. 19A illustrates an example of bijection between vertices, in accordance with an embodiment of the invention.

FIG. 19A illustrates an example of bijection between vertices, in accordance with an embodiment of the invention. In one embodiment, every good neuron is trained according to a perceptron learning rule. Specifically, every good neuron has a target output. For every good perception neuron in the bottom-up digraph, the target output is simply the output of the corresponding good action neuron in the top-down digraph, and also the complement of the output of the corresponding bad action neuron in the top-down digraph.

Similarly, for every good action neuron in the top-down digraph, the target output is simply the output of the corresponding bad perception neuron in the bottom-up digraph, and also the complement of the output of the corresponding bad perception neuron in the bottom-up digraph. In another embodiment, a Winnow learning rule or its variants may also be used.

For bad every neuron, there is no associated learning. Bad neurons are simply used to train good neurons in counter path.

Figure 19B:
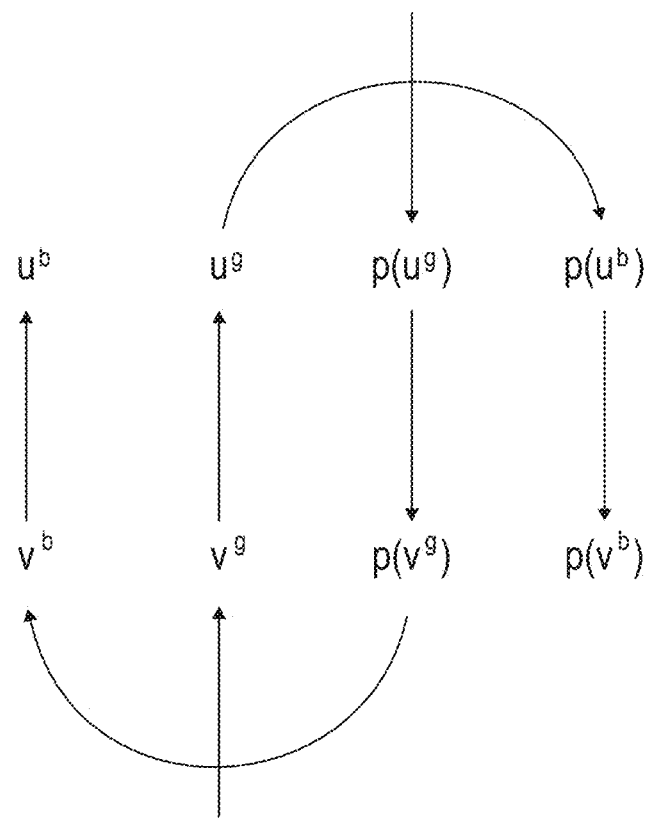
FIG. 19B illustrates another example of bijection between vertices, in accordance with an embodiment of the invention.

FIG. 19B illustrates another example of bijection between vertices, in accordance with an embodiment of the invention.

In both FIGS. 19A and 19B, good perception neurons in the $u^g$ vertex are trained to approximate good action neurons in the $P(u^g)$ vertex and not to approximate bad action neurons in the $P(u^b)$ vertex. If a neuron in the $u^g$ vertex fires but a corresponding neuron in the the $P(u^g)$ vertex does not, this is a false positive. The neuron in the $u^g$ vertex is trained to unlearn the false positive. If a neuron in the $u^g$ vertex does not fire but a corresponding neuron in the $P(u^g)$ vertex does fire, this is a false negative. The neuron in the $u^g$ vertex is trained to learn the false negative. Similarly, good perception neurons in the $v^g$ vertex are trained to approximate good action neurons in the $P(v^g)$ vertex and not to approximate bad action neurons in the $P(v^b)$ vertex.

Figure 20:
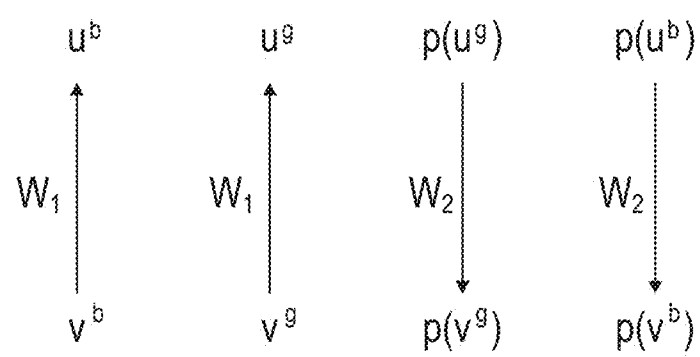
FIG. 20 illustrates an example of weights of the synaptic connections between neuron populations, in accordance with an embodiment of the invention.

FIG. 20 illustrates an example of weights of the synaptic connections between neuron populations, in accordance with an embodiment of the invention. The weight of the synaptic connections interconnecting the neurons in the $v^g$ vertex to the neurons in the $u^g$ vertex must be the same as the weight of the synaptic connections interconnecting the neurons in the $v^b$ vertex to the neurons in the $u^b$ vertex. Similarly, the weight of the synaptic connections interconnecting the neurons in the $P(u^g)$ vertex to the neurons in the $P(v^g)$ vertex must be the same as the weight of the synaptic connections interconnecting the neurons in the $P(u^b)$ vertex to the neurons in the $P(v^b)$ vertex.

In one embodiment, the weight of the synaptic connections interconnecting the neurons in the $v^g$ vertex to the neurons in the $u^g$ vertex is asymmetric to the weight of the synaptic connections interconnecting the neurons in the $P(u^g)$ vertex to the neurons in the $P(v^g)$ vertex. Likewise, the weight of the synaptic connections interconnecting the neurons in the $v^b$ vertex to the neurons in the $u^b$ vertex is asymmetric to the weight of the synaptic connections interconnecting the neurons in the $P(u^b)$ vertex to the neurons in the $P(v^b)$ vertex.

Figure 21:
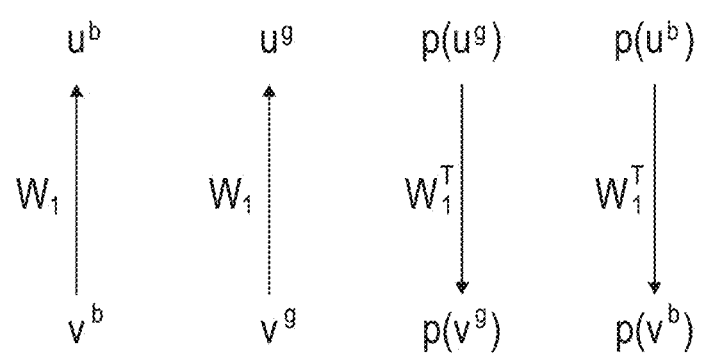
FIG. 21 illustrates another example of weights of the synaptic connections between neuron populations, in accordance with an embodiment of the invention.

FIG. 21 illustrates another example of weights of the synaptic connections between neuron populations, in accordance with an embodiment of the invention. In another embodiment, the weight of the synaptic connections interconnecting the neurons in the $v^g$ vertex to the neurons in the $u^g$ vertex is symmetric to the weight of the synaptic connections interconnecting the neurons in the $P(u^g)$ vertex to the neurons in the $P(v^g)$ vertex. Likewise, the weight of the synaptic connections interconnecting the neurons in the $v^b$ vertex to the neurons in the $u^b$ vertex is symmetric to the weight of the synaptic connections interconnecting the neurons in the $P(u^b)$ vertex to the neurons in the $P(v^b)$ vertex.

Symmetric weights are the preferred embodiment for the example provided in FIG. 19A. Symmetric or asymmetric weights may be used for the example provided in FIG. 19B.

Figure 22A:
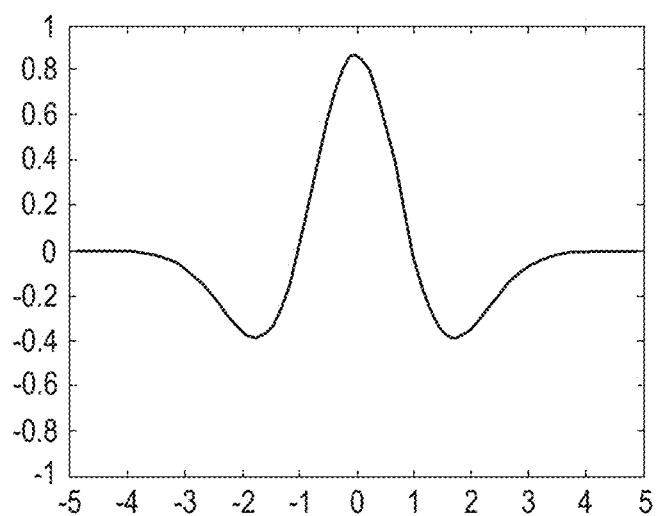
FIG. 22A illustrates an example Hebbian learning rule, in accordance with the present invention.

FIG. 22A illustrates an example Hebbian learning rule, in accordance with the present invention. In one embodiment, the neurons 1 in the neural network 600 are spiking neurons. The Hebbian learning rule is applied when a good neuron fires.

Figure 22B:
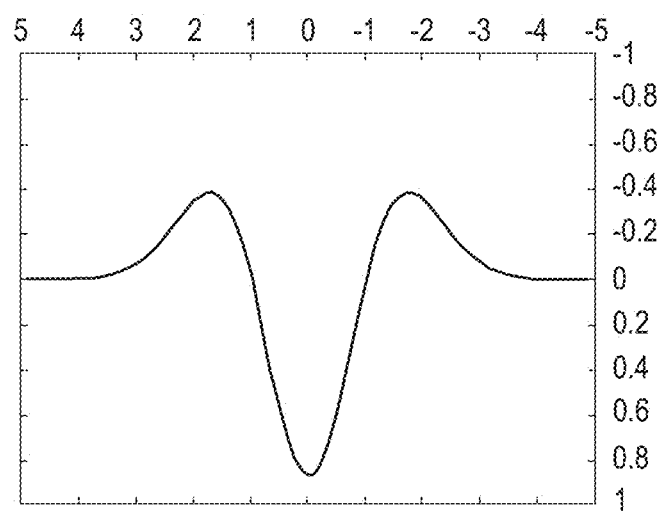
FIG. 22B illustrates an example anti-Hebbian learning rule, in accordance with the present invention.

FIG. 22B illustrates an example anti-Hebbian learning rule, in accordance with the present invention. The anti-Hebbian learning rule is applied when a bad neuron fires.

Figure 23:
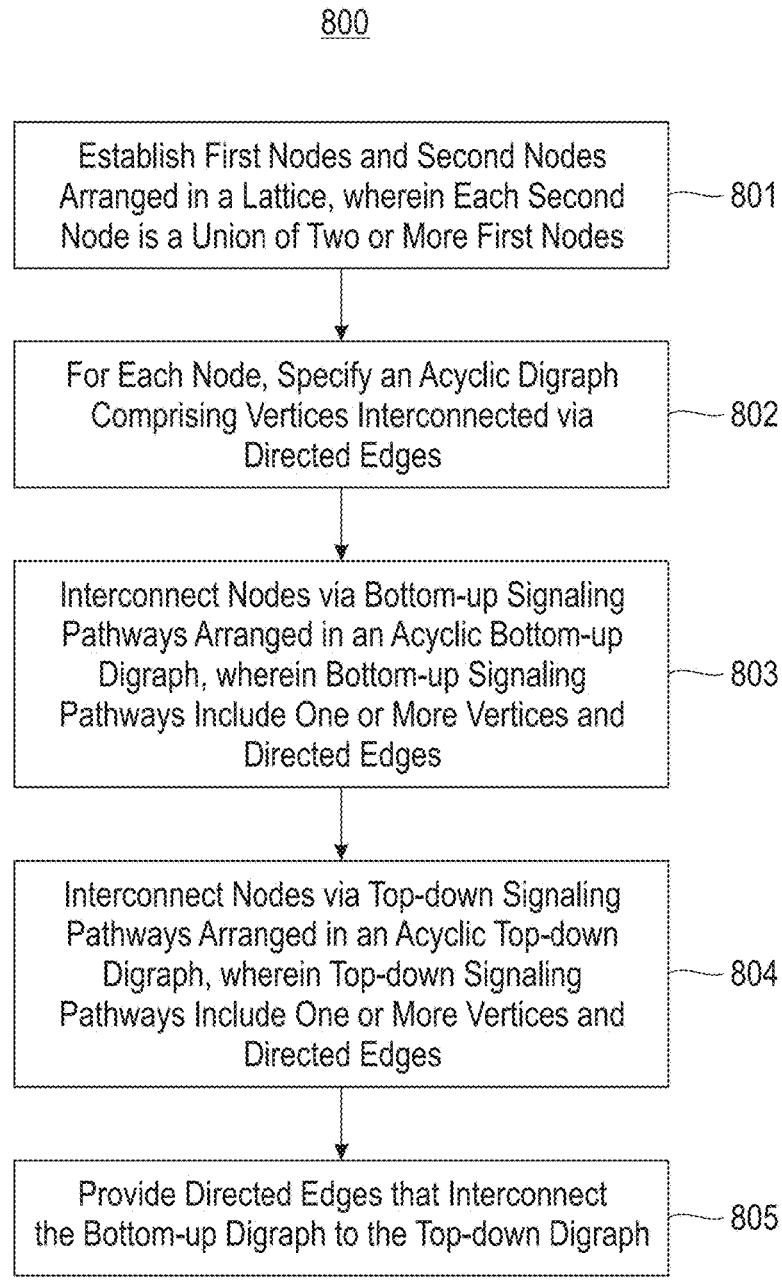
FIG. 23 illustrates a flowchart of an example process 800 for a lattice, in accordance with an embodiment of the invention.

FIG. 23 illustrates a flowchart of an example process 800 for a lattice, in accordance with an embodiment of the invention. In process block 801, establish first nodes and second nodes arranged in a lattice, wherein each second node is a union of two or more first nodes. In process block 802, for each node, specify an acyclic digraph comprising vertices interconnected via directed edges. In process block 803, interconnect nodes via bottom-up signaling pathways arranged in an acyclic bottom-up digraph, wherein bottom-up signaling pathways include one or more vertices and directed edges. In process block 804, interconnect nodes via top-down signaling pathways arranged in an acyclic top-down digraph, wherein top-down signaling pathways include one or more vertices and directed edges. In process block 805, provide directed edges that interconnect the bottom-up digraph to the top-down digraph.

Figure 24:
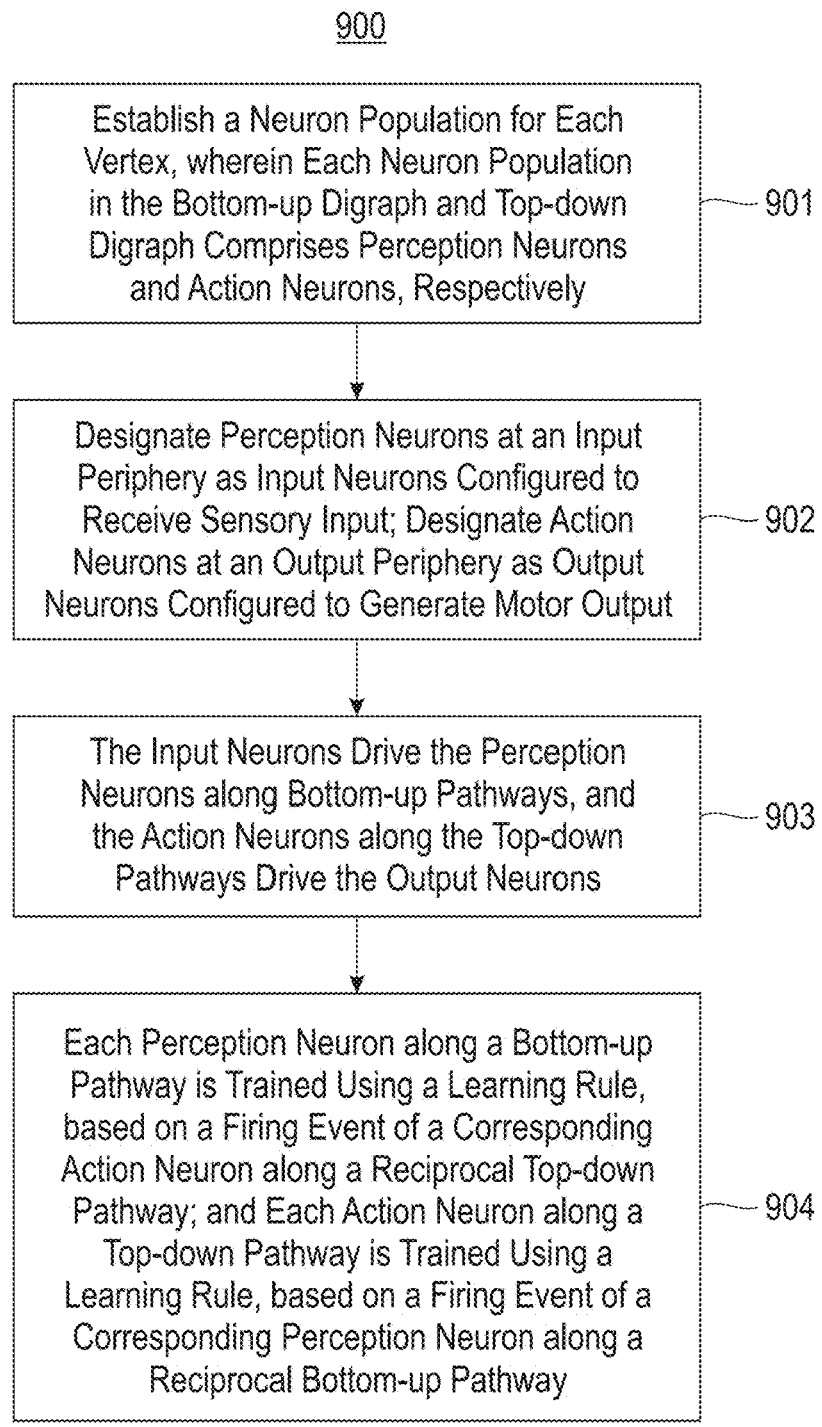
FIG. 24 illustrates a flowchart of an example process 900 for a neural network, in accordance with an embodiment of the invention.

FIG. 24 illustrates a flowchart of an example process 900 for a neural network, in accordance with an embodiment of the invention. In process block 901, establish a neuron population for each vertex, wherein each neuron population in the bottom-up digraph and top-down digraph comprises perception neurons and action neurons, respectively. In process block 902, designate perception neurons at an input periphery as input neurons configured to receive sensory input, and designate action neurons at an output periphery as output neurons configured to generate motor output. In process block 903, the input neurons drive the perception neurons along bottom-up pathways, and the action neurons along the top-down pathways drive the output neurons. In process block 904, each perception neuron along a bottom-up pathway is trained using a learning rule, based on a firing event of a corresponding action neuron along a reciprocal top-down pathway, and each action neuron along a top-down pathway is trained using a learning rule, based on a firing event of a corresponding perception neuron along a reciprocal bottom-up pathway.

Figure 25:
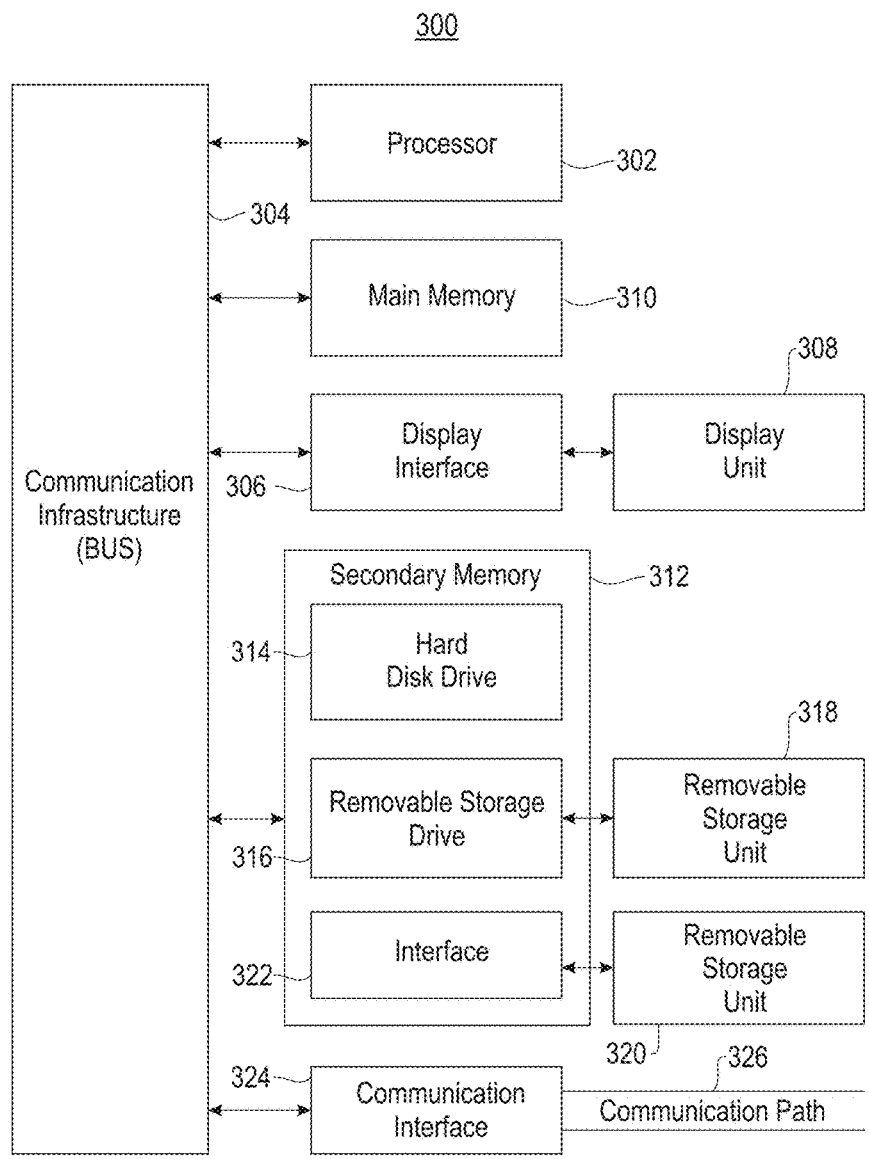
FIG. 25 is a high level block diagram showing an information processing circuit 300 useful for implementing one embodiment of the present invention.

FIG. 25 is a high level block diagram showing an information processing circuit 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving motor output from one or more neurons along a top-down signaling pathway of a neuromorphic and synaptronic hardware architecture comprising electronic circuitry in response to the one or more neurons firing, wherein the one or more neurons correspond to one or more other neurons along a bottom-up signaling pathway of the neuromorphic and synaptronic hardware architecture;
   determining whether the motor output is a first type of motor output or a second type of motor output based on firing events of a first neuron of the one or more neurons and firing events of a second neuron of the one or more other neurons, wherein the second neuron corresponds to the first neuron; and
   training the one or more other neurons to approximate the one or more neurons by:
      in response to determining the motor output is the first type of motor output, training the one or more other neurons to learn the motor output by routing the motor output and a first input to a third neuron and a fourth neuron of the neuromorphic and synaptronic hardware architecture, respectively; and
      in response to determining the motor output is the second type of motor output, training the one or more other neurons to unlearn the motor output by routing the motor output and the first input to the fourth neuron and the third neuron, respectively;
   wherein the neuromorphic and synaptronic hardware architecture resulting from the training is a single universal substrate for unsupervised learning, supervised learning, and reinforcement learning.

2. The method of claim 1, wherein:
   the first input represents a zero input for preventing deadlock in active propagation;
   the motor output is the first type of motor output in response to determining the first neuron does not fire but the second neuron fires; and
   the motor output is the second type of motor output in response to determining the first neuron fires but the second neuron does not fire.

3. The method of claim 2, wherein, in response to determining the motor output is the first type of motor output, the motor output is routed to the third neuron to train the third neuron to learn the motor output.

4. The method of claim 3, wherein the first type of motor output represents a false negative.

5. The method of claim 1, wherein, in response to determining the motor output is the second type of motor output, the motor output is routed to the fourth neuron to train the fourth neuron to unlearn the motor output.

6. The method of claim 5, wherein the second type of motor output represents a false positive.

7. The method of claim 1, wherein the neuromorphic and synaptronic hardware architecture comprises a plurality of neurons interconnected via a first set of signaling pathways and a second set of signaling pathways, and each neuron along a signaling pathway of the first set corresponds to another neuron along a signaling pathway of the second set.

8. The method of claim 7, further comprising:
   training each neuron along a signaling pathway of the first set using a first learning rule; and
   training each neuron along a signaling pathway of the second set using a second learning rule different from the first learning rule.

9. A system comprising a computer processor, a computer-readable hardware storage device, and program code embodied with the computer-readable hardware storage device for execution by the computer processor to implement a method comprising:
   receiving motor output from one or more neurons along a top-down signaling pathway of a neuromorphic and synaptronic hardware architecture comprising electronic circuitry in response to the one or more neurons firing, wherein the one or more neurons correspond to one or more other neurons along a bottom-up signaling pathway of the neuromorphic and synaptronic hardware architecture;
   determining whether the motor output is a first type of motor output or a second type of motor output based on firing events of a first neuron of the one or more neurons and firing events of a second neuron of the one or more other neurons, wherein the second neuron corresponds to the first neuron; and
   training the one or more other neurons to approximate the one or more neurons by:
      in response to determining the motor output is the first type of motor output, training the one or more other neurons to learn the motor output by routing the motor output and a first input to a third neuron and a fourth neuron of the neuromorphic and synaptronic hardware architecture, respectively; and
      in response to determining the motor output is the second type of motor output, training the one or more other neurons to unlearn the motor output by routing the motor output and the first input to the fourth neuron and the third neuron, respectively;
   wherein the neuromorphic and synaptronic hardware architecture resulting from the training is a single universal substrate for unsupervised learning, supervised learning, and reinforcement learning.

10. The system of claim 9, wherein:
the first input represents a zero input for preventing deadlock in active propagation;
the motor output is the first type of motor output in response to determining the first neuron does not fire but the second neuron fires; and
the motor output is the second type of motor output in response to determining the first neuron fires but the second neuron does not fire.

11. The system of claim 10, in response to determining the motor output is the first type of motor output, the motor output is routed to the third neuron to train the third neuron to learn the motor output.

12. The system of claim 11, wherein the first type of motor output represents a false negative.

13. The system of claim 9, wherein, in response to determining the motor output is the second type of motor output, the motor output is routed to the fourth neuron to train the fourth neuron to unlearn the motor output.

14. The system of claim 13, wherein the second type of motor output represents a false positive.

15. The system of claim 9, wherein the neuromorphic and synaptronic hardware architecture comprises a plurality of neurons interconnected via a first set of signaling pathways and a second set of signaling pathways, and each neuron along a signaling pathway of the first set corresponds to another neuron along a signaling pathway of the second set.

16. The system of claim 15, the method further comprising:
training each neuron along a signaling pathway of the first set using a first learning rule; and
training each neuron along a signaling pathway of the second set using a second learning rule different from the first learning rule.

17. A computer program product comprising a computer-readable hardware storage device having program code embodied therewith, the program code being executable by a computer to implement a method comprising:
receiving motor output from one or more neurons along a top-down signaling pathway of a neuromorphic and synaptronic hardware architecture comprising electronic circuitry in response to the one or more neurons firing, wherein the one or more neurons correspond to one or more other neurons along a bottom-up signaling pathway of the neuromorphic and synaptronic hardware architecture;
determining whether the motor output is a first type of motor output or a second type of motor output based on firing events of a first neuron of the one or more neurons and firing events of a second neuron of the one or more other neurons, wherein the second neuron corresponds to the first neuron; and
training the one or more other neurons to approximate the one or more neurons by:
in response to determining the motor output is the first type of motor output, training the one or more other neurons to learn the motor output by routing the motor output and a first input to a third neuron and a fourth neuron of the neuromorphic and synaptronic hardware architecture, respectively; and
in response to determining the motor output is the second type of motor output, training the one or more other neurons to unlearn the motor output by routing the motor output and the first input to the fourth neuron and the third neuron, respectively;
wherein the neuromorphic and synaptronic hardware architecture resulting from the training is a single universal substrate for unsupervised learning, supervised learning, and reinforcement learning.

18. The computer program product of claim 17, wherein:
the motor output is the first type of motor output in response to determining the first neuron does not fire but the second neuron fires;
in response to determining the motor output is the first type of motor output, the motor output is routed to the third neuron to train the third neuron to learn the motor output; and
the first type of motor output represents a false negative.

19. The computer program product of claim 17, wherein:
the motor output is the second type of motor output in response to determining the first neuron fires but the second neuron does not fire:
in response to determining the motor output is the second type of motor output, the motor output is routed to the fourth neuron to train the fourth neuron to unlearn the motor output; and
the second type of motor output represents a false positive.

20. The computer program product of claim 17, wherein the neuromorphic and synaptronic hardware architecture comprises a plurality of neurons interconnected via a first set of signaling pathways and a second set of signaling pathways, each neuron along a signaling pathway of the first set corresponds to another neuron along a signaling pathway of the second set, each neuron along a signaling pathway of the first set is trained using a first learning rule, and each neuron along a signaling pathway of the second set is trained using a second learning rule different from the first learning rule.

* * * * *